(12) United States Patent
Murray et al.

(10) Patent No.: US 8,726,800 B2
(45) Date of Patent: May 20, 2014

(54) METHOD AND MECHANICAL PRESS SYSTEM FOR THE GENERATION OF DENSIFIED CYLINDRICAL BRIQUETTES

(75) Inventors: Donald Louis Murray, St-Augustin-de-Desmaures (CA); Guy Côté, Québec (CA)

(73) Assignee: 9177-4331 Québec inc., Saint-Augustin-de-Desmaures, QC (CA)

( * ) Notice: Subject to any disclaimer, the term of this patent is extended or adjusted under 35 U.S.C. 154(b) by 465 days.

(21) Appl. No.: 13/215,222

(22) Filed: Aug. 22, 2011

(65) Prior Publication Data

US 2012/0042793 A1 Feb. 23, 2012

Related U.S. Application Data

(60) Provisional application No. 61/376,037, filed on Aug. 23, 2010.

(51) Int. Cl.
*B30B 13/00* (2006.01)
*B30B 7/04* (2006.01)
*B30B 9/28* (2006.01)
*B30B 11/00* (2006.01)

(52) U.S. Cl.
CPC ............... *B30B 7/04* (2013.01); *B30B 11/005* (2013.01); *B30B 11/007* (2013.01)
USPC .................... 100/35; 100/39; 100/42; 100/49; 100/50; 100/98 R; 100/218; 100/232; 100/240; 100/264

(58) Field of Classification Search
USPC ........... 100/35, 39, 43, 45, 48, 49, 50, 51, 52, 100/94, 97, 98 R, 215, 218, 226, 229 R, 232, 100/240, 244, 245, 264, 906; 425/130, 141, 425/149, 150; 29/238; 264/40.5
See application file for complete search history.

(56) References Cited

U.S. PATENT DOCUMENTS 1,473,389 A 11/1923 Smith et al.
(Continued)

FOREIGN PATENT DOCUMENTS

DE 4039788 6/1992
EP 0367859 5/1990
EP 0490148 6/1992

OTHER PUBLICATIONS

Pawert-SPM, Binderless briquetting, description available at http://www.pawert-spm.ch/en/was%20wir%20herstellen.htm, Sep. 11, 2008.
Holzmag Recycling Systems Gmbh, Elan B60, Briquetting press, description available at http://www.holzmag.com/hm/media/de_dateien/dokumente/prospekte/2010%20Elan%20B60%20DE-EN.pdf, 2010.
(Continued)

*Primary Examiner* — Jimmy T Nguyen
(74) *Attorney, Agent, or Firm* — Fasken Martineau

(57) ABSTRACT

A method for preparing a pressed article comprises providing a first and a second pressing ram in a compression chamber; supplying biomass particles in the chamber closing the chamber; extending the first pressing ram; displacing the biomass particles with the first pressing ram towards the second pressing ram; detecting abutment of the biomass particles on the second pressing ram; applying pressure to the biomass particles with the first pressing ram and with the second pressing ram detecting a pressure applied to match a predetermined pressure and continuing to extend the first and the second pressing ram until a predetermined time at the matched compression pressure has elapsed; stopping the extension of the second pressing ram when a predetermined extension length is reached; continuing to extend the first pressing ram until a predetermined additional time has elapsed after the stopping; ejecting a pressed article.

22 Claims, 20 Drawing Sheets

(56) References Cited

U.S. PATENT DOCUMENTS

| | | | |
|---|---|---|---|
| 1,796,465 | A | 3/1931 | Komarek et al. |
| 1,931,759 | A | 10/1933 | Hasing |
| 2,358,765 | A | 9/1944 | Stadlin |
| 2,384,163 | A | 9/1945 | Flowers |
| 2,398,227 | A | 4/1946 | Hubbert |
| 2,825,092 | A | 3/1958 | Hatch et al. |
| 2,945,259 | A | 7/1960 | Decker et al. |
| 3,134,156 | A | 5/1964 | Komarek |
| 3,154,812 | A | 11/1964 | Haller |
| 3,353,215 | A | 11/1967 | Haller |
| 3,593,378 | A | 7/1971 | Metrailer |
| 3,736,084 | A | 5/1973 | Mitchell |
| 3,791,802 | A | 2/1974 | Holowaty |
| 3,811,813 | A | 5/1974 | Taccone |
| 3,988,095 | A | 10/1976 | Mersch et al. |
| 4,028,035 | A | 6/1977 | Komarek |
| 4,124,338 | A | 11/1978 | Mitchell |
| 4,257,145 | A * | 3/1981 | Bovino ................... 425/556 |
| 4,333,394 | A * | 6/1982 | Brown ...................... 100/42 |
| 4,798,529 | A | 1/1989 | Klinner |
| 5,059,372 | A | 10/1991 | Klais |
| 5,202,067 | A | 4/1993 | Solazzi et al. |
| 5,326,511 | A | 7/1994 | Cooper et al. |
| 6,546,855 | B1 | 4/2003 | Van Der Beek et al. |
| 6,782,595 | B1 | 8/2004 | Van Der Beek et al. |
| 6,921,427 | B2 | 7/2005 | Nayak et al. |
| 6,941,860 | B2 | 9/2005 | Van Der Beek et al. |
| 2010/0300368 | A1 | 12/2010 | Myers et al. |

OTHER PUBLICATIONS

C.F. Nielsen A-S, Briquetting Hydraulic Presses, description available at http://www.cfnielsen.com/briquetting.php?id=9, Oct. 25, 2011.

Bogma AB, Bogma machines, description available at http://www.bogma.com/eng/index.htm, 2011.

Gross Apparatebau GMBH, Briquetting presses GP Genius 2/50, 2/60, 2/70 for volume reduction and production of heating material, description available at http://www.gross-zerkleinerer.de/english/machines/briquetting-presses-genius-series.htm, 2011.

Dipiu' SRL, Mechanical briquetting press—Brik series—MB50, description available at http://www.di-piu.com/brik50_uk.html, 2011.

New Air Technical Services Limited, Shimada Extrusion Press Type SPMM 850KS, description available at http://shimada.co.uk/Shimada-Extrusion-Press.php. , 2007.

Reinbold Entsorgungstechnik GmbH, Briquetting presses RB 20 SV-60 SV, description available at http://www.reinbold.de/english/machines/briquetting-presses/rb20-60sv-prestige-e.htm, 2011.

Biomass Briquette Systems LLC, Hydraulic Briquetter, description available at http://www.biomassbriquettesystems.com/products/3/hydraulic-briquetter, Oct. 4, 2011.

Security Engineered Machinery, Eco-Saver™ Briquetting Systems, description available at http://www.semshred.com/contentmgr/showdetails.php/id/1201, 2011.

Lippel, BL-55, Mechanical Briquettting, description available at http://www.lippel.com.br/es/fabricacion-de-briquetas/briqueteadoras-mecanicas.html, 2011.

\* cited by examiner

METHOD AND MECHANICAL PRESS SYSTEM FOR THE GENERATION OF DENSIFIED CYLINDRICAL BRIQUETTES

CROSS-REFERENCE TO RELATED APPLICATIONS

This application claims priority under 35 USC §119(e) of U.S. provisional patent application No. 61/376,037 filed Aug. 23, 2010, the specification of which is hereby incorporated by reference.

TECHNICAL FIELD

The invention relates to a method and a mechanical press system for the generation of densified cylindrical briquettes, ingots or pucks from various fiber materials, including residual waste.

BACKGROUND OF THE ART

Densification systems generally have two broad goals. The first goal is to reduce the volume of a certain material to facilitate its transportation. The second goal is to normalize the shape and size of the densified product, called briquettes, to facilitate its handling and often to make it compatible with mechanized handling equipment.

In the case of biomass and waste material destined for energy production, an additional goal of the densification is to improve the combustion or gasification of the material, by generating fuel briquettes of a certain size, shape and density. For example a pile of wood sawdust does not burn very well, but a briquette made of the same sawdust can make an excellent solid fuel.

The densification of biomass and waste material is somewhat more difficult to achieve than the densification of inert or inorganic material such as metal chips. This is because biomass and waste material are heterogeneous mixtures and the successful generation of briquettes with this material is influenced by its composition, moisture content and particle size distribution. Presses designed for the densification of biomass and waste material have certain characteristics in order to reliably process these materials into briquettes.

Biomass briquettes made of woody fibers generally fall in three categories: logs (or ingots), pucks and pellets. Fuel ingots vary in diameter from 50 mm to 100 mm, and are usually 60 mm to 150 mm long. They are generally used as a cleaner and more consistent alternative to residential firewood logs, offering a higher energy density and steady combustion. Fuel pucks have similar diameters to ingots but can be 25 mm to 50 mm in length. Fuel pucks are used in co-firing coal-powered electric generation as well as in institutional heating, greenhouse heating, and combined heat and power (CHP) applications. Fuel pellets are smaller cylinders usually with a 6 mm to 8 mm diameter and with a length that is variable around 10-15 mm. Pellets are almost exclusively made from wood sawdust and have been developed relatively recently as an alternative to fossil fuels such as natural gas and heating oil. Their size is such that they can be conveniently blown from a tanker to a storage silo and they can be fed to a burner by a simple auger feeding. A broad range of pellet stoves, central heating furnaces, and other heating appliances have been developed recently.

Ingot or puck briquetting systems provide flexibility and advantages with respect to pellet plants. Ingot or puck briquetting systems accept a wider range of feedstock, which is especially useful when wood sawdust feedstock is scarce. Ingot or puck briquetting feed stock particle size does not need to be ground as fine as pellet operations and they are more tolerant with respect to humidity content. Pellets are more expensive to produce than briquettes and excessive handling causes them to degrade and become dustier. The extreme pressures used in pelletizing systems (1.7 GPa) causes wear and parts such as dies need replacing regularly. This can represent a significant operating cost. Periodic, replacement of motor drives within pellet mills is also common. Because of their larger surface to volume ratio, pellets need to be kept dry and can only be stored for a relatively short period of time. Moreover, pelletizing of materials containing contaminants such as lime, clay and/or other low temperature melting point constituents is a severe operational production limitation. The high operating temperatures cause the material to liquefy and plug the orifice of the pellet press dies. For the most part pelletizing is applied to woody biomass waste and they are not suitable for agro-food waste or other types of waste.

The majority of the high throughput (>500 kg/hr), industrial briquette presses require high capital acquisition costs, are constructed from costly proprietary components and are subject to high operational and maintenance fees.

The prior art systems and method for the generation of densified logs or briquettes from various fiber materials have many drawbacks

SUMMARY

The current invention aims to provide a small-scale, low-entry price briquette press to facilitate the conversion of a broad range of urban waste to a normalized solid fuel. Compared to pellet presses, the current invention minimizes the front-end processing of the feedstock to improve system reliability and reduce operating costs per ton of solid fuel processed.

According to one broad aspect of the present invention, there is provided a method for preparing a pressed article from compressible and cohesive biomass particles. The method comprises providing a first pressing ram and a second pressing ram operating in opposite directions and disposed in a compression chamber, in retracted position; supplying a quantity of biomass particles in a space in the compression chamber between the first and second pressing rams; closing the compression chamber; extending the first pressing ram towards the biomass particles in the compression chamber; displacing the biomass particles with the first pressing ram towards the second pressing ram; detecting abutment of the biomass particles on the second pressing ram once the biomass particles are displaced by the first pressing ram to touch the second pressing ram; applying pressure to the biomass particles with the first pressing ram by extending the first pressing ram to abut the biomass particles on the second pressing ram and with the second pressing ram by extending the second press ram to abut the biomass particles on the first pressing ram; detecting a pressure applied to match a predetermined compression pressure and continuing to extend the first pressing ram and the second pressing ram until a predetermined time at the matched compression pressure has elapsed, thereby forming a pressed article; stopping the extension of the second pressing ram when a predetermined extension length for the second pressing ram is reached; continuing to extend the first pressing ram until a predetermined additional time has elapsed after the stopping; ejecting a pressed article made of compressed biomass particles from the compression chamber.

According to another broad aspect of the present invention, there is provided a press for preparing a pressed article from compressible and cohesive biomass particles. The press comprises a housing; a first pressing ram and a second pressing ram operating in opposite directions and disposed in a compression chamber; a first pressure detector for the first pressing ram; a second pressure detector for the second pressing ram; a first actuator for the first pressing ram; a second actuator for the second pressing ram; an electronic control circuit adapted to control the first and second pressing rams using the first and second actuators and to receive signals from the first and second pressure detectors, the electronic control circuit being programmed to control the first and second pressing rams for: extending the first pressing ram towards the biomass particles in the compression chamber; displacing the biomass particles with the first pressing ram towards the second pressing ram; detecting abutment of the biomass particles on the second pressing ram once the biomass particles are displaced by the first pressing ram to touch the second pressing ram; applying pressure to the biomass particles with the first pressing ram by extending the first pressing ram to abut the biomass particles on the second pressing ram and with the second pressing ram by extending the second press ram to abut the biomass particles on the first pressing ram; detecting a pressure applied to match a predetermined compression pressure and continuing to extend the first pressing ram and the second pressing ram until a predetermined time at the matched compression pressure has elapsed, thereby forming a pressed article; stopping the extension of the second pressing ram when a predetermined extension length for the second pressing ram is reached; continuing to extend the first pressing ram until a predetermined additional time has elapsed after the stopping; ejecting a pressed article made of compressed biomass particles from the compression chamber.

In this specification, the term briquette is intended to mean any product of a press, namely a pressed article, regardless of the size or shape of this product.

The term ingot is used to designate a briquette of diameter around 50 mm and of length 1 to 4 times its diameter.

The term puck is used to designate a briquette of diameter around 50 mm and of length around half of its diameter.

BRIEF DESCRIPTION OF THE DRAWINGS

Having thus generally described the nature of the invention, reference will now be made to the accompanying drawings, showing by way of illustration an example embodiment thereof and in which.

It will be noted that throughout the appended drawings, like features are identified by like reference numerals.

DETAILED DESCRIPTION

Multiple fiber feedstock can be converted to solid briquette ingots using the present invention, including: wood sawdust, wood sanding dust, wood cut-offs, wood pruning residue, peat moss, construction & demolition wood waste, wood & mixed plastics fines resulting from recycling, food-grade waxed cardboard, milk and juice containers, ordinary corrugated cardboard, paper, non-recyclable hard cover books, short & long fiber paper sludge, cotton, linen, synthetic fibers, fibers from old rug waste, waste magnetic tape, agro-food waste fiber, solid digestive byproduct resulting from anaerobic digestion, and dry sludge from waste water treatment plants.

Figure 1:
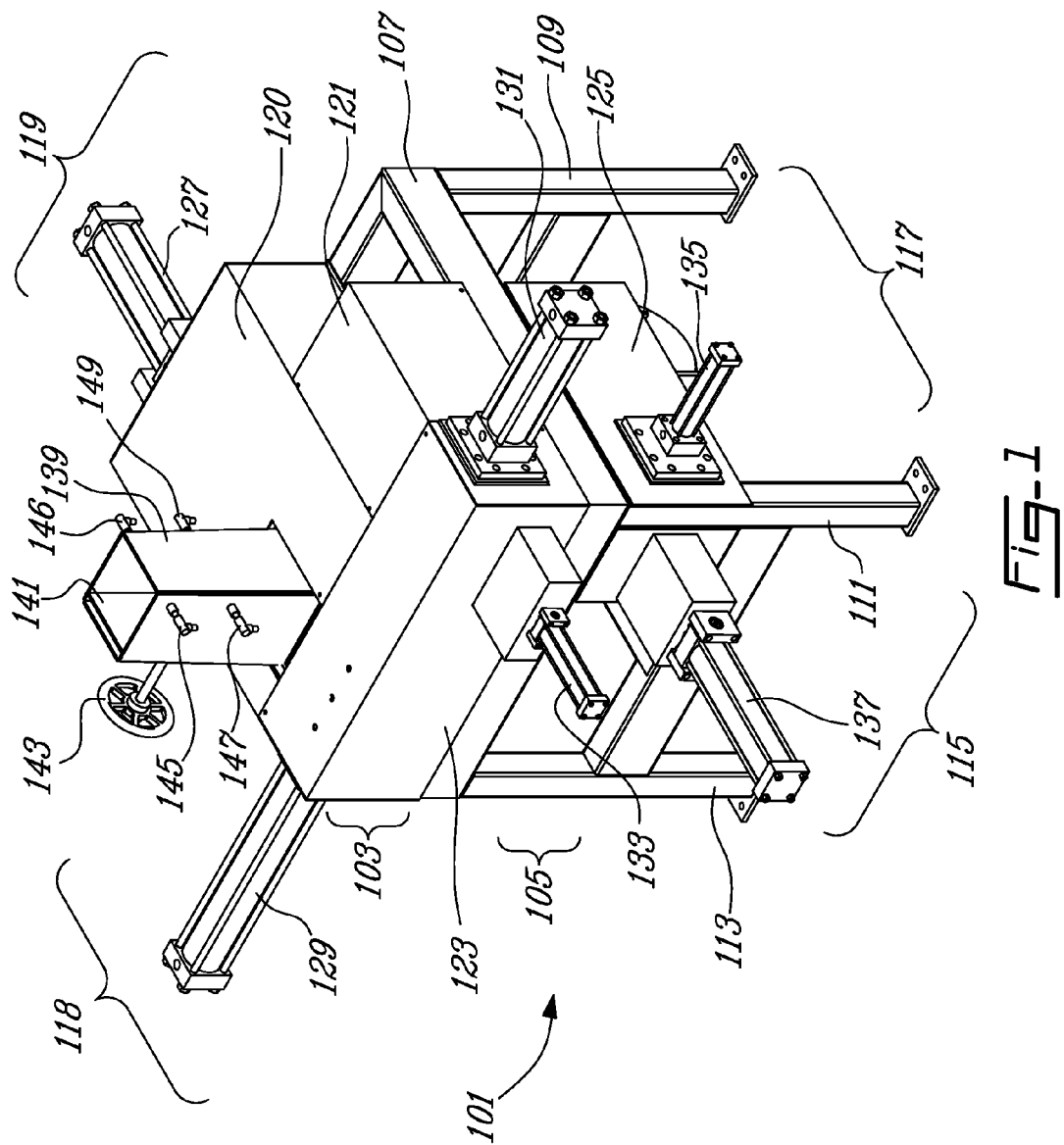
FIG. 1 is a perspective view of an example press with its industrial casings.

FIG. 1 shows an example embodiment of the mechanical press 101. The press is constructed on two main levels, the upper level 103 and the lower level 105 arranged respectively above and below a main horizontal frame 107. The horizontal frame 107 is resting on four legs, three of which 109, 111 and 113 are visible in FIG. 1. The front 115 and the right side 117 of the press 101 are most visible in FIG. 1, while the left side 118 and the back 119 are partially visible. Apart from the various protective covers 120, 121, 123 and 125, six actuators 127, 129, 131, 133, 135 and 137 are shown in FIG. 1.

The hopper 139 has a rectangular cross-sectional shape and extends vertically from the upper level. The top of the hopper 139 is open ended to allow filling with compressible material. The hopper 139 acts as a bulk material reserve or receptacle of a generally rectangular prismatic shape. The hopper 139 is equipped with an internal vertically extending rectangular panel 141 facing the right side 117 of the press 101 with dimensions that nearly fit inside the hopper 139 rectangular volume. The moving panel 141 can be translated horizontally in a direction normal to its surface within the hopper 139 using a screw 143.

The hopper 139 is equipped with high-level 145, 146 and low-level 147, 149 photocell sensors, to allow sensing the level of the compressible material.

Figure 2:
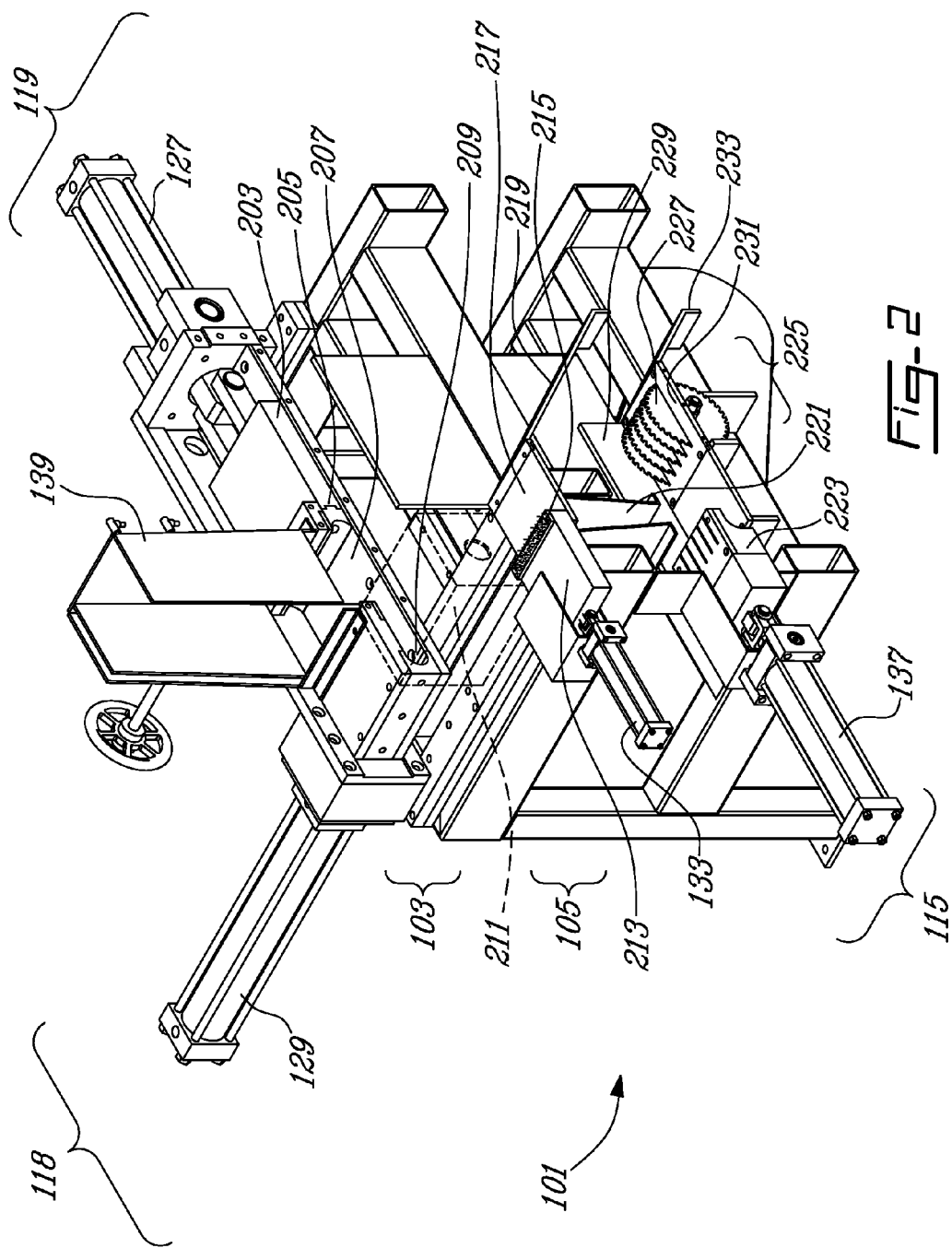
FIG. 2 is a perspective broken-away view of the example press of FIG. 1 with some of its industrial casings removed to show the internal components of the press.

FIG. 2 provides a broken-away and internal view of the example mechanical press 101 shown in FIG. 1.

The pre-compression ram 203 is located in the upper level 103 of the press 101. The pre-compression ram 203 is a rectangular pushing device terminated with a concave cylindrical end 205 and can move in and out along an axis perpendicular to the hopper 139. The pre-compression ram 203 is displaced using a linear actuator 127 which extends toward the back of the machine 119.

The width of the pre-compression ram 203 is matched with the width of the hopper 139. When fully extended the pre-compression ram 203 forms the bottom of the hopper 139. When the pre-compression ram 203 is fully retracted, the bottom of the hopper 139 is the pre-compression ram floor 207, thereby increasing the volume capacity of the hopper 139.

The pre-compression chamber 209 is located in the front side of the upper level 103 of the press 101. The pre-compression chamber 209 is formed by a hollow cylindrical cavity with an axis oriented in the left-right direction, perpendicular to the pre-compression ram 203 actuator 127 axis.

The long cylinder (not visible in FIG. 2) is a pushing cylinder oriented and aligned on the same axis as the pre-compression chamber 209. The long cylinder can be displaced using a linear actuator 129 which extends toward the left of the machine 118.

The compression chamber 211 (represented with dash lines in FIG. 2) is located in the front side of the upper level 103 of the press 101. The compression chamber 211 is directly to the right and precisely aligned with the pre-compression chamber 209.

The eject ram 213 is a rectangular object located on the front side of the upper level 103 of the press 101 and extending towards the front 115 of the press 101. The eject ram 213 can be displaced using a linear actuator 133 which extends toward the front 115 of the press 101. The eject ram 213 is oriented along a front-back axis perpendicular to the compression chamber 211, but a small distance below the compression chamber 211 centerline. This allows the full movement of the eject ram 213, even when objects protrude out of the compression chamber 211.

The eject ram 213 is equipped with a brush 215 on the back end of its rectangular section and extends vertically higher than the bottom level of the compression chamber 211.

An eject floor 217 is located under the eject ram 213. The eject floor 217 is not fixed permanently and can be removed by an operator.

The ingot chute 219 is a plane surface meeting with the back end of the eject floor 217 and inclined towards the back to allow objects to roll down its surface if placed on it.

The sawing chute 221 is a vertically oriented rectangular funnel located just underneath the eject floor 217. Its top is located in the upper level 103 of the press 101 and its bottom is located in the lower level 105 of the press 101.

The sawing ram 223 is a rectangular object terminated with an off-center cylindrical concave cavity. The sawing ram 223 is located on the front side of the lower level 105 of the press 101 and extending towards the front 115 of the press 101. The saw ram 223 can be displaced using a linear actuator 137 which extends toward the front 115 of the press 101. The sawing ram 213 is oriented along a front-back axis parallel to the eject ram 213 but underneath the eject ram 213.

The saw assembly 225 is composed of a series of circular blades 227, a sawing reference wall 229 and a saw floor 231. The saw module 225 is located . . .

The puck chute 233 is a plane surface meeting with the back end of the saw floor 231 and inclined towards the back to allow objects to roll down its surface if placed on it.

Figure 3:
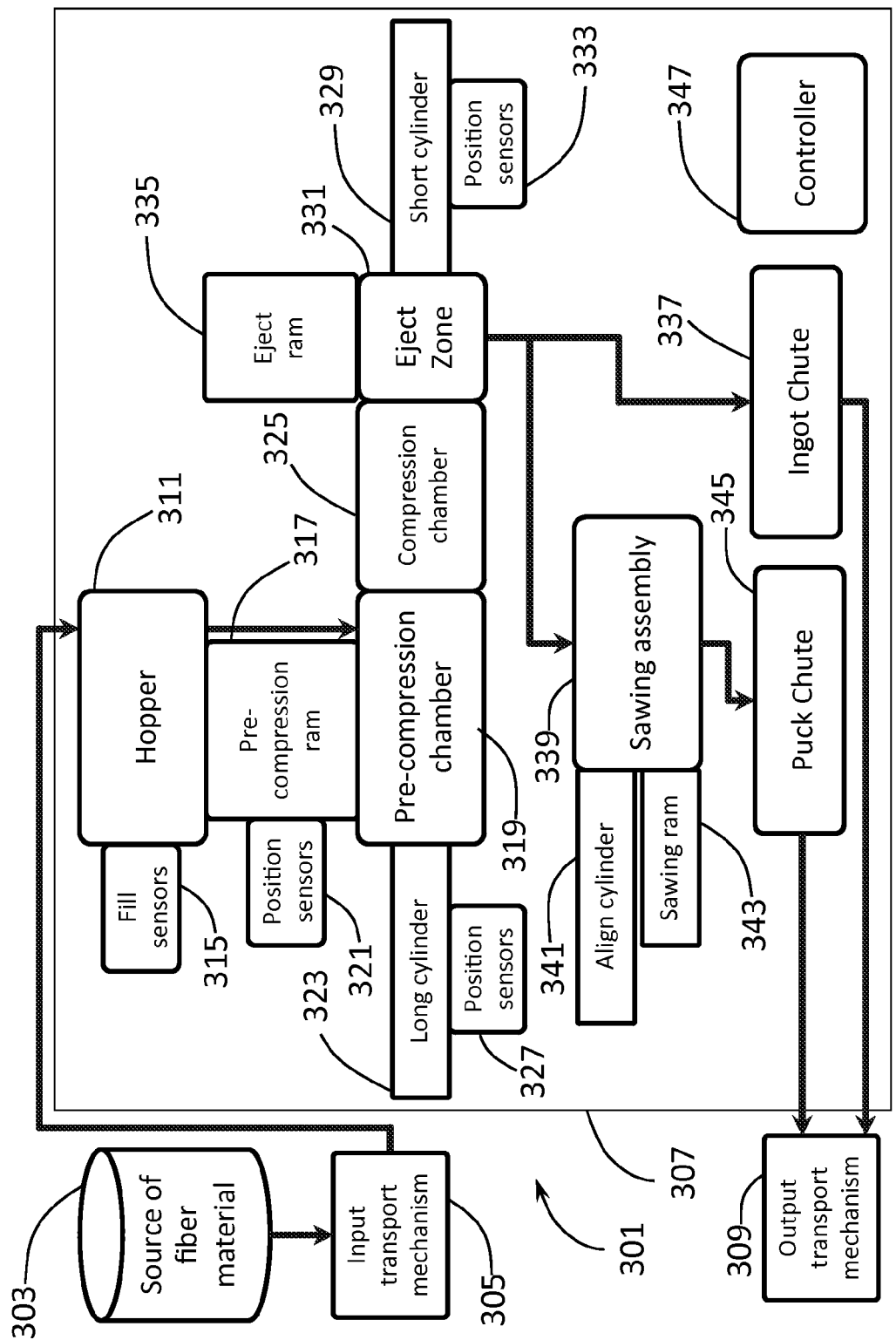
FIG. 3 is a system diagram of the main components of the example press.

FIG. 3 shows system diagram 301 of the input fiber material 303, an input transport mechanism 305, the proposed mechanical press 307 and the output densified ingots or puck transport mechanism 309.

The input transport mechanism 305 can be a belt or a screw conveyor or any other appropriate means of transporting the input material to the hopper. The input transport mechanism 305 receives stop and go signals from the controller 347.

The hopper 311 is a rectangular prism volume used as a small reserve to feed the next step in the press. The hopper 311 is equipped with high-level and low-level fill sensors 315. The controller 313 uses to the fill sensors 315 to send receives stop and go signals to the input transport mechanism 305 to keep the amount of material in the hopper 311 approximately constant. This ensures that the level of compaction at the bottom of the hopper 311 is approximately constant.

The pre-compression ram 317 pushes the layer of material at the bottom of the hopper 311 towards the pre-compression chamber 319, thus forming a cylinder of material with a moderate level of densification. The pre-compression ram 317 may be equipped with position sensors 321 to allow changing the pressure profile of its actuator as a function of position, if required.

The final densification stage is performed in part by the long cylinder 323. This cylindrical push rod is used to push the pre-compressed material out of the pre-compression chamber 319 and into the compression chamber 325. The compression chamber 325 is a cylindrical hollow cavity where the long cylinder 323 can enter from one end and when the compression is completed can push the compressed material out the other end. The long cylinder is equipped with several position sensors 327 to allow changing the pressure profile of its actuator as a function of position and to allow optimal control of other actuators.

In order to keep the pre-compressed material inside the compression chamber 325 during the compression stage, a short cylinder 329 is inserted at the end of the compression chamber 325 opposite from where the long cylinder 323 enters. The short cylinder 329 actually performs a compression movement synchronized and in the opposite direction of the compression movement of the long cylinder 323. This double-sided compression approach maximizes the uniformity of the compressed material. Once the compression is complete, the short cylinder 329 retracts and allows the compressed material to be ejected in the eject zone 331. The short cylinder 329 is equipped with several position sensors 333 to allow changing the pressure profile of its actuator as a function of position and to allow optimal control of other actuators.

The eject ram 335 has two purposes. First it is used to nudge the compressed material from the long cylinder 323 and/or the short cylinder 329, in cases of sticking. Second the eject ram 335 is used as ram to push the ingot down the ingot chute 337, in the cases where the final product are ingots rather than pucks. The ingots fall down the chute where an output transport mechanism 309, usually a belt conveyor, collects the final product.

The press 307 can be configured to produce pucks instead of ingots. In this case rather than being pushed to the ingot chute 337, the ingots go to a saw assembly 339. In the saw assembly 339, the ingots are first aligned against a cutting guide using an align cylinder 341. Next the ingot is pushed through an array of cutting blade using a sawing ram 343. The pucks then fall into the puck chute 345 where the output transport mechanism 309 collects the final product.

An electronic controller 347 is used to automate the operation of the press 307.

Figure 4:
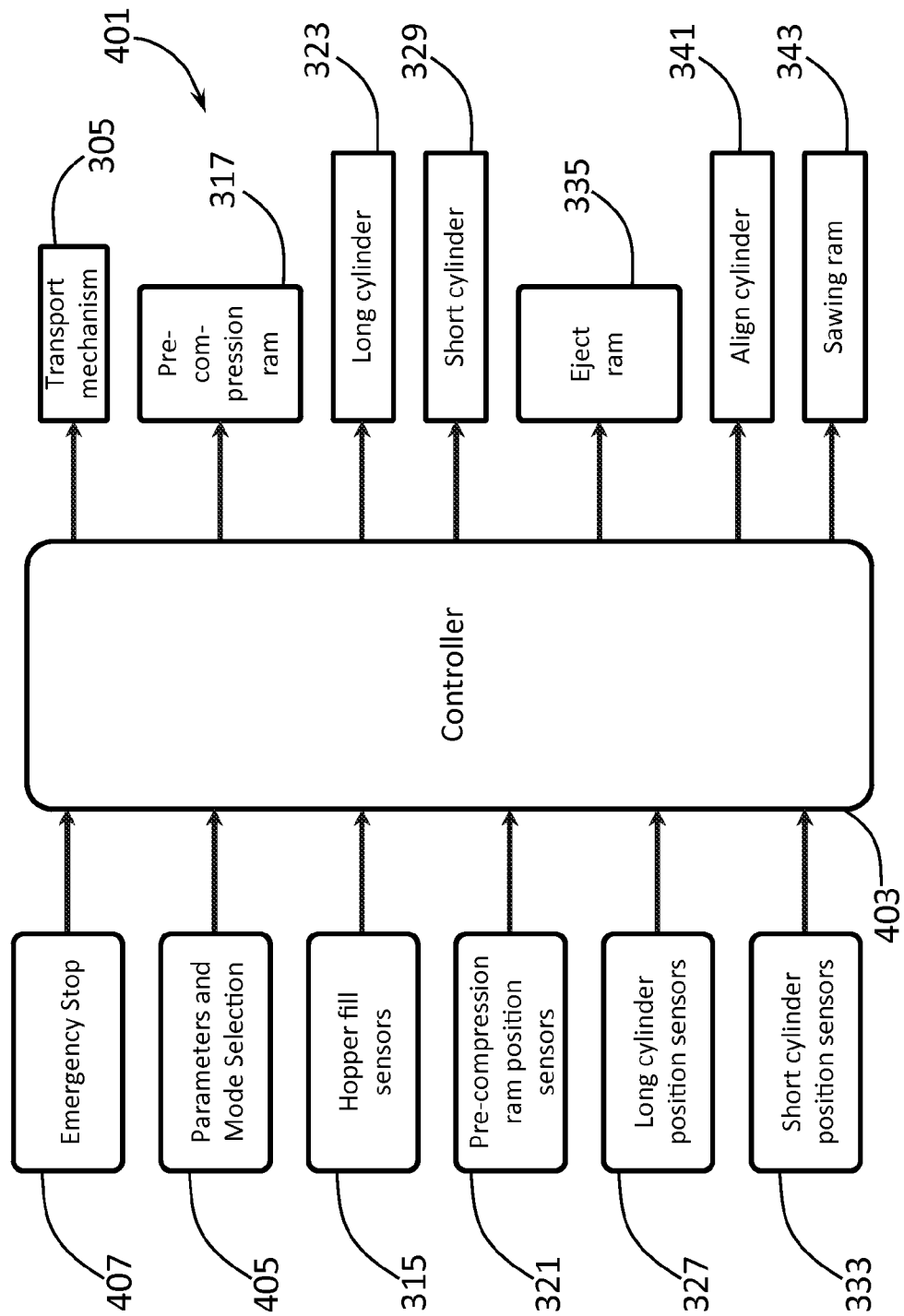
FIG. 4 is a control diagram of the example press.

FIG. 4 is the control diagram of the example press. The controller 403 can be a programmable logic controller or any other type of suitable controller. The controller 403 receives inputs from the user in the form of input parameters and mode selection 405 as well as emergency stop 407 inputs. The input parameters are variables such as actuator pressure, moving speed as well as wait times that the user can change according to the type of feed material. The mode selection allows operating in an automatic mode or a manual mode. The manual mode is necessary for troubleshooting and re-initialization in case of an anomalous stop.

The controller 403 also receives inputs from several sensors installed in the press, including the hopper fill sensors 315, the pre-compression ram position sensors 321, the long cylinder position sensors 327 and the short cylinder position sensors 333.

The controller 403 utilizes a sequencer to control its output signals according to a predetermined chain of events. The sequencer advanced through it various steps according to the inputs signals and expected behavior of the system. According to the expected step in the sequence, the controller 403 changes the state of its outputs which are used to control the motion of the actuators such as the input transport mechanism 305, the pre-compression ram 317, the long cylinder 323, the short cylinder 329, the eject ram 335, the align cylinder 341 and the saw ram 343.

Figure 5:
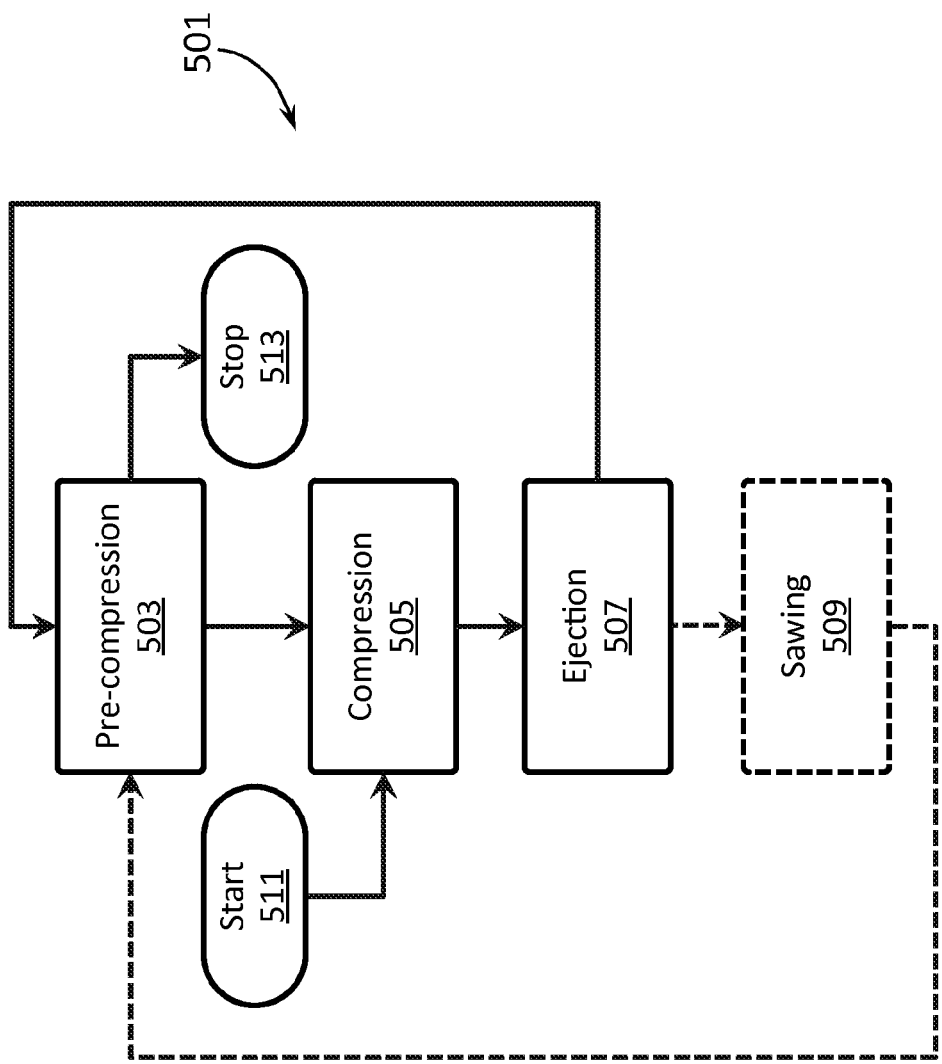
FIG. 5 is a flow chart of the main steps of the example method.

As shown in FIG. 5, there are three main stages of the sequence 501 of the press: the pre-compression 503, the compression 505 and the ejection 507. The optional sawing 509 stage is used to produce pucks instead of ingots.

The nominal ingot-producing automated mode is represented by the solid line loop in FIG. 5. The nominal puck-producing automated mode is represented by a feedback loop in dashed lines n FIG. 5.

The start and stop points are somewhat arbitrary in an infinite loop. In the example flow chart, the start point 511 is at the beginning of the compression 505 stage, because the most critical actuators, namely the long cylinder 323 and the short cylinder 329 are completely retracted at this point in the cycle, allowing for visual inspection and maintenance if required.

Figure 6:
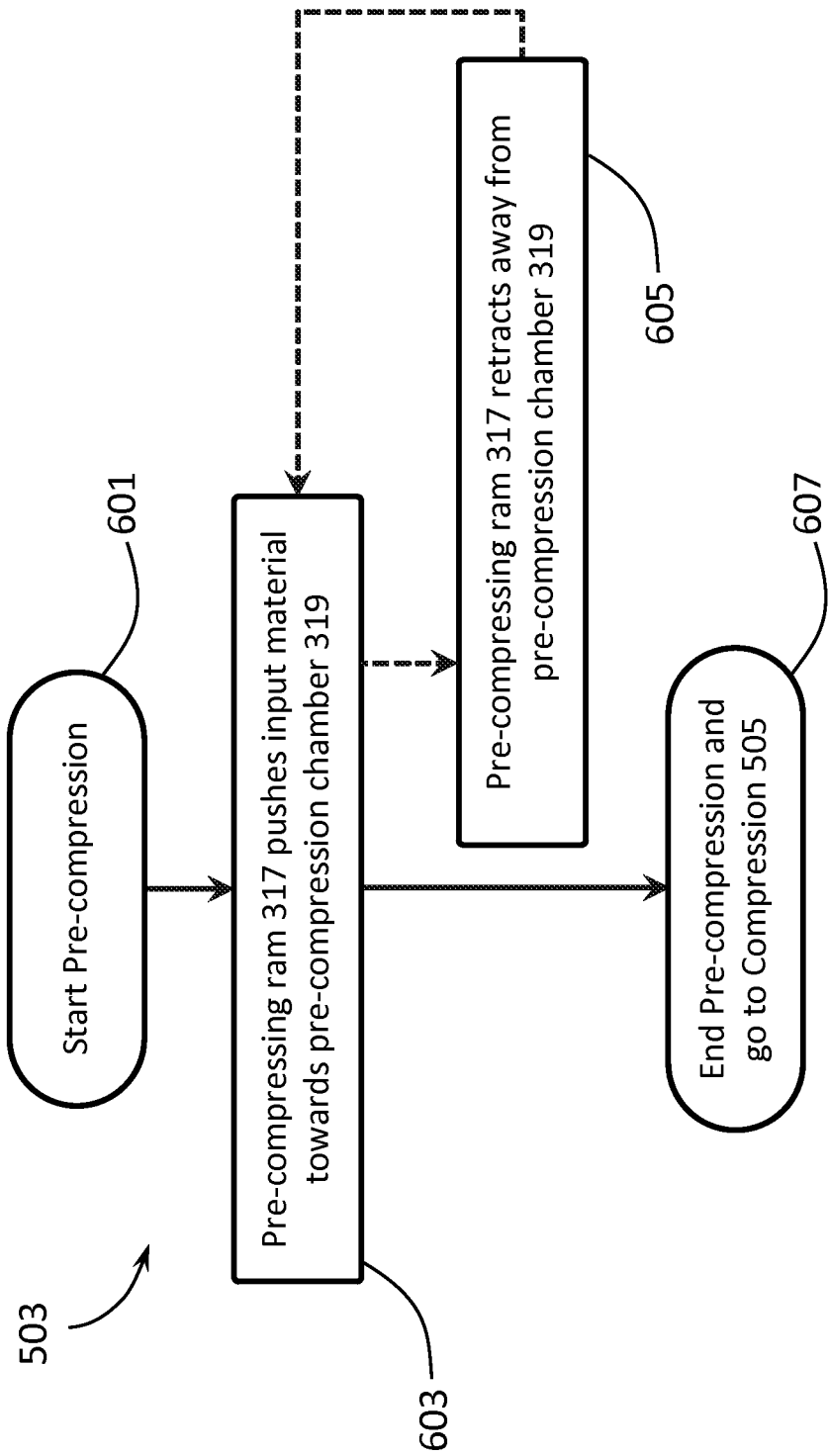
FIG. 6 is a flow chart of the sub-steps of the pre-compression stage of FIG. 5.

The pre-compression stage 503 is illustrated in FIG. 6. The main step 603 of the pre-compression stage 503 is the motion of pre-compressing ram 317 pushing input material towards pre-compression chamber 319. In most case this completes the pre-compression stage 503. In some cases of very low density material there may not be enough material admitted in the pre-compression chamber 319, even if the hopper is adjusted to its maximum volume using the moving panel 141. In these cases the system can use the optional step 605, where the pre-compressing ram 317 retract to its home position, so an additional quantity of input material can be used. Step 603 is repeated and the quantity of pre-compressed material can be doubled, tripled, etc. The number of times the pre-compressing ram 317 introduces material in the pre-compression chamber 319 is input by the user as an input parameter 405.

Figure 7:
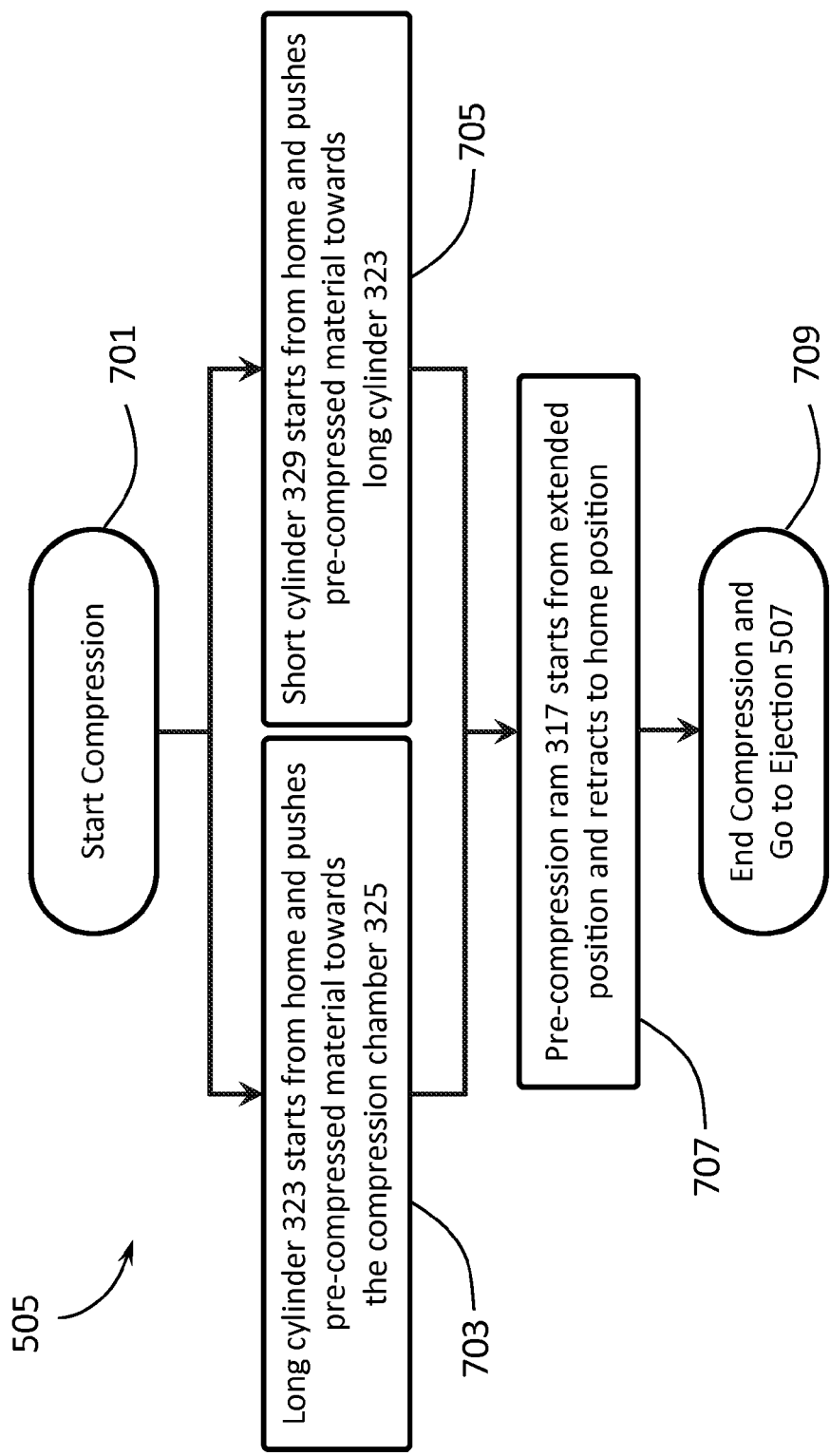
FIG. 7 is a flow chart of the sub-steps of the compression stage of FIG. 5.

The compression stage 505 is illustrated in FIG. 7. During compression, both the long cylinder 323 and the short cylinder 329 move towards the center of the compression chamber 325, in steps 703 and 705 thereby compressing further the pre-compressed material. Step 707 indicates that when the long cylinder 323 has closed the pre-compression chamber 319, the pre-compression ram 317 can leave its extended position and retracts to its home position.

Figure 8:
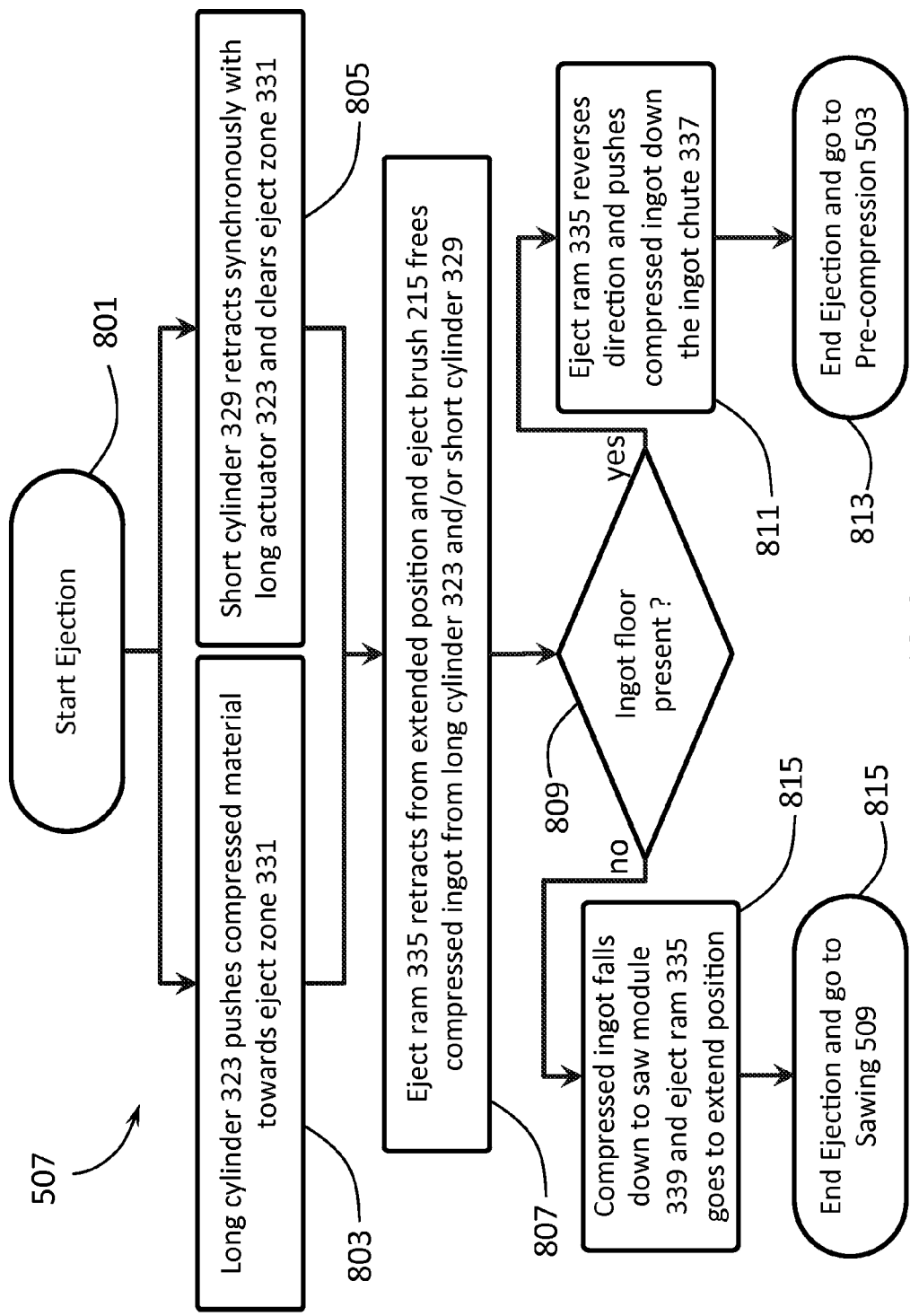
FIG. 8 is a flow chart of the sub-steps of the ejection stage of FIG. 5.

The ejection stage 507 is illustrated in FIG. 8. After the start of the ejection stage 507, the long cylinder 323 and the short cylinder 329 move synchronously to bring the compressed material to the eject zone 331, as illustrated in steps 803 and 805. As seen in FIG. 2, the eject ram 335 is lower than the height of the compression chamber 325 and is equipped with an eject brush 215 that extends higher than the lower level of the compression chamber 325. In step 807, the eject brush 215 nudges the compressed material and frees it from the tip of the long cylinder 323 and/or the short cylinder 329. As indicated in step 809, if the ingot floor 227 is present, the eject ram 335 reverses direction and pushes the compressed ingot down the ingot chute 337. If the ingot floor 227 is not present, the compressed ingot falls into the saw module 339 and the eject ram 335 goes to its extended home position.

Figure 9:
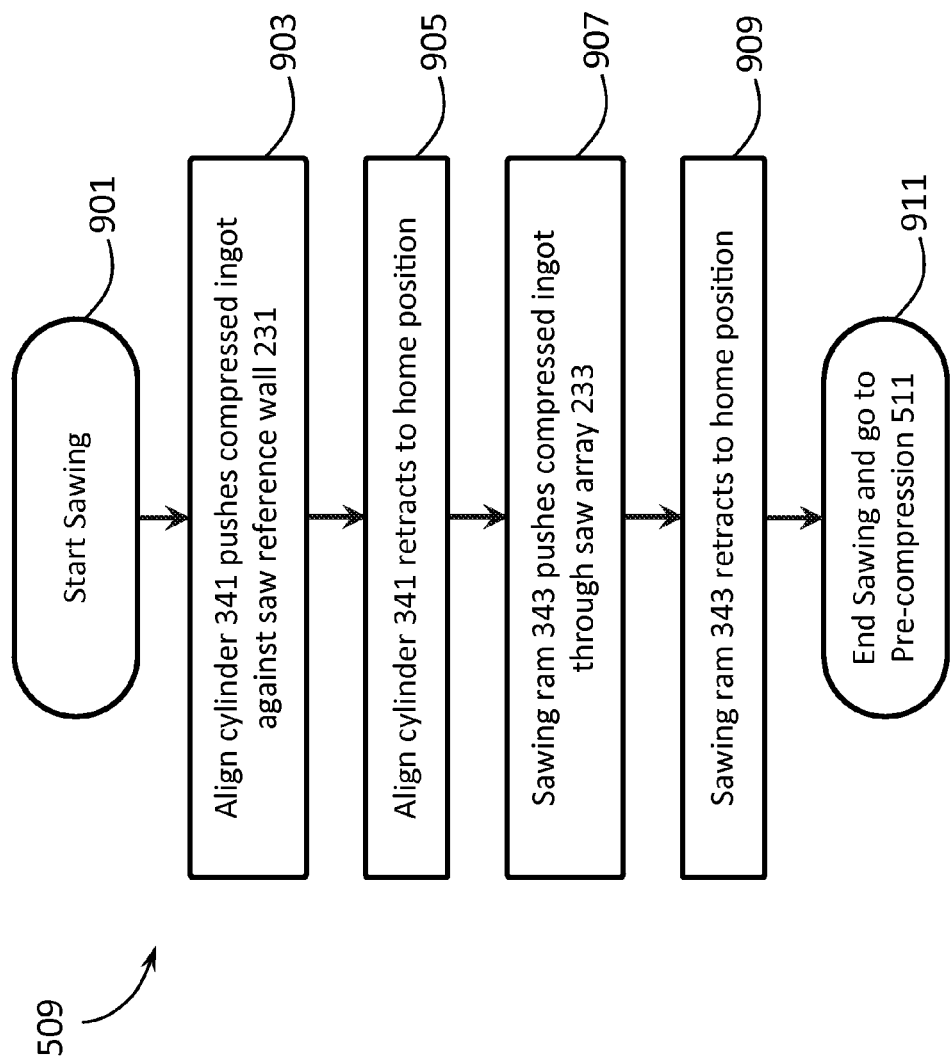
FIG. 9 is a flow chart of the sub-steps of the sawing stage of FIG. 5.

The optional sawing stage 509 is illustrated in FIG. 9. In the first step 903, the align cylinder 341 pushes the ingot against saw reference wall 229. In the second step 905, the align cylinder 341 retracts to its home position. Next in step 907, the sawing ram 343 pushes the ingot through the saw array 227, thereby generating pucks which fall to the puck chute 345. In the final step 909, the sawing ram 343 retracts to its home position.

Figure 10:
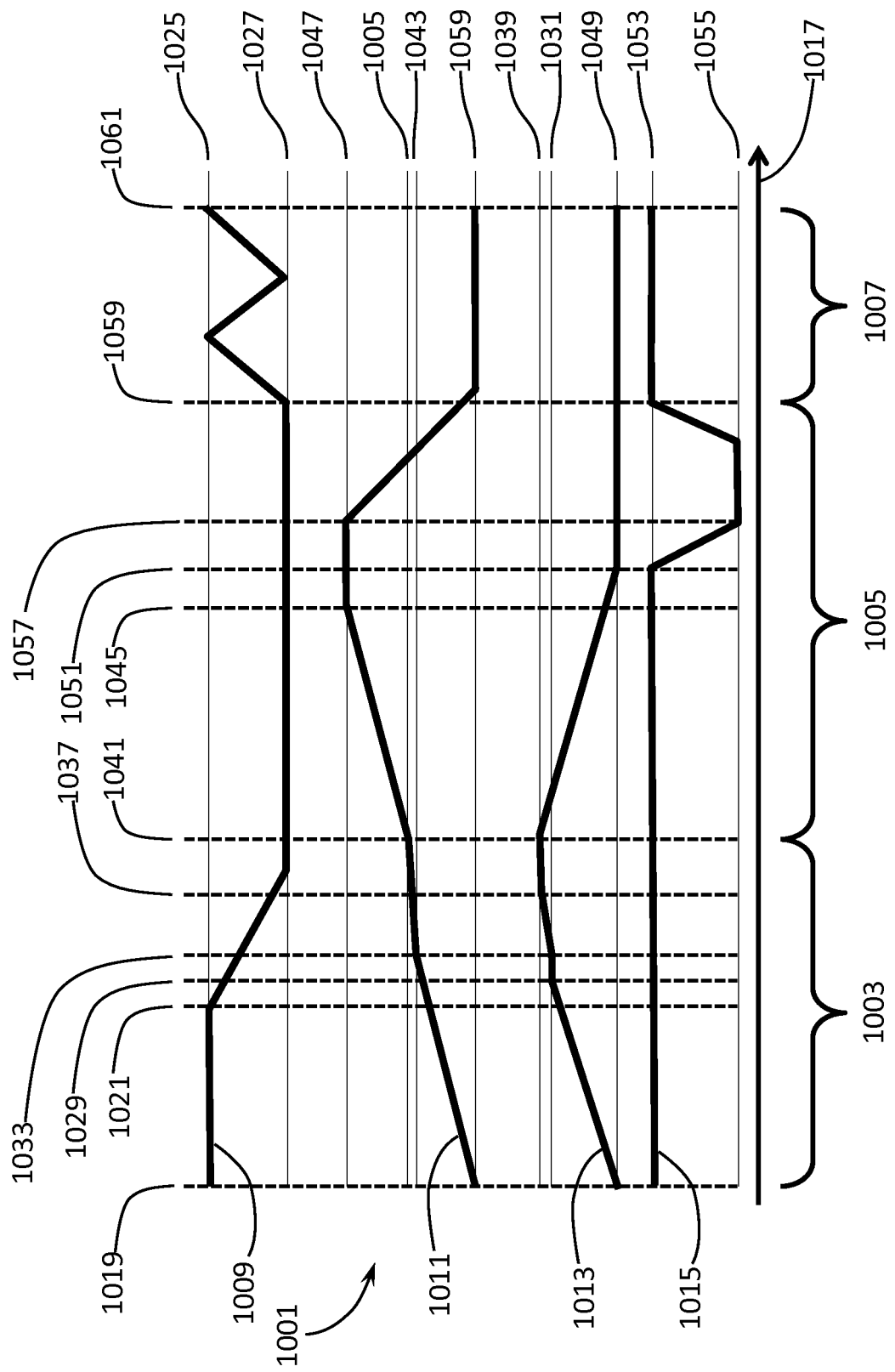
FIG. 10 is an example timing diagram for the compression stage, the ejection stage and the pre-compression stage.

FIG. 10 illustrates an example timing diagram 1001 covering the compression stage 1003, the ejection stage 1005 and the pre-compression stage 1007. The timing diagram 1001 plots along its vertical axis (Y-axis) the displacement of the four following linear actuators: pre-compression ram 1009, the long cylinder 1011, the short cylinder 1013 and the eject ram 1015, against a common time scale 1017 (X-axis). The convention for the displacement of the linear actuators along the vertical axis (Y-axis) is the following: Extension is in the upward direction and retraction is in the downward direction. Note that FIG. 10 is a simplification and that the scales both in the Y-axis and the X-axis are arbitrary and not to scale.

At the beginning 1019 of the compression stage 1003, the long cylinder 323 represented by line 1011 and the short cylinder 329 represented by line 1013 both move in extension towards the center of the compression chamber 325. At time 1021 when the long cylinder 323 has expelled the pre-compressed material from the pre-compression chamber 319, as illustrated by the reference position 1021, the pre-compression ram 317 represented by line 1009 is allowed to leave its extended position 1025 at the pre-compression chamber 319 and starts retracting towards its home position 1027.

At time 1029 when the short cylinder 329 represented by line 1013, clears the eject zone and reaches its position 1031 where it caps the compression 325 with a small adjustable offset depending on the material being densified, the short cylinder 329 is stopped and allowed to be locked in position. For an push-pull hydraulic system, for example, this can be achieved by shutting off the cylinder hydraulic valves. This stop position 1031 is sensed by the controller 347 using a contact-less position sensor on the short cylinder 329.

The short cylinder 329 waits at this position 1031 until the material being pushed by the long cylinder 323 reaches the tip of the short cylinder 329. At this moment 1033, the long cylinder 323 represented by line 1011 is at position 1035. Position 1035 is not a fixed position in space as it vary according to the quantity of pre-compressed material admitted in the compression chamber 325. Starting at position 1035, the speed of the long cylinder 323 will decrease due to the extra resistance caused by the compression of the material, as illustrated by the lower slope in line 1011 in the time interval 1033 to 1037. At time 1033, the system controller 347 senses the extra resistance on the long cylinder 323 as a pre-set pressure on the digital hydraulic pressure sensor and signals short cylinder 329 to continue its extension. Cylinders 329 and 323 are activated for the distinct programmable time interval 1033 to 1037 when the hydraulic pressure has reached the given set pressure setpoint, thereby effecting an adequate compression at the short cylinder end of the compressed material. At the end of this compression motion at time 1037, the short cylinder 329 is commanded again to hold its position 1039 for a pre-determined time interval 1037 to 1041. During this time interval 1037 to 1041 the long cylinder 323 continues compressing the material until is reaches position 1043.

At time 1041, the short cylinder 329 is commanded to retract. The speed of displacement of short cylinder 329 is adjusted to match the speed of displacement of the long cylinder 323, so they move together transporting the compressed ingot, until time 1045 when the ingot has cleared the compression chamber 325. The relative speed control is effected by the use of a bypass hydraulic valve enabling the flow of hydraulic fluid from actuator C2 to actuator C3. At this time 1045, the long cylinder 323 stops at its extended position 1047, just outside the compression chamber.

The short cylinder 329 moves an additional short distance and stops at its fully retracted position 1049, helping to release the compressed ingot. At this moment 1051, the eject ram 325 retracts starting from its fully extended position 1053 towards its fully retracted position 1055. During the time interval 1051 to 1057, the eject brush XXX mounted on the eject ram 325 pushes the compressed ingot in the upwards direction allowing it to unstick from the long or short cylinder tip if required. The eject ram is enabled only if the signal from the photocell in the ejection chamber confirms that a fuel ingot is indeed present at the exit of the compression chamber. The eject ram 325 reaches it fully retracted position 1055 at time 1057. At time 1057, the long cylinder 323 is moved towards its fully retracted position 1059.

Before the long cylinder 323 reaches its fully retracted position 1059, the precompression ram 317 is moved from its fully contracted position 1027 towards the pre-compression chamber 319 to perform pre-compression of the input material its pushes from the hopper.

Figure 11:
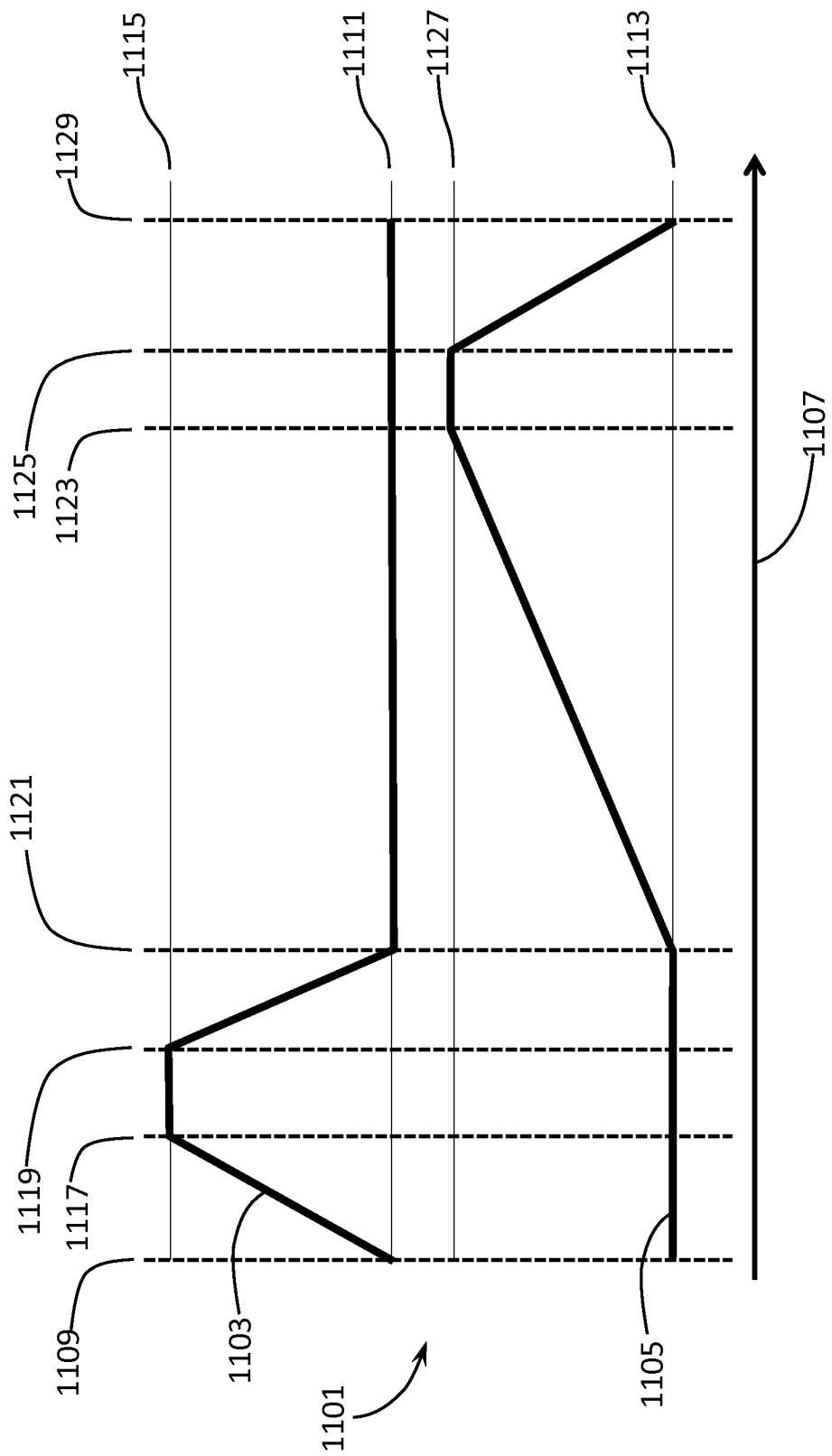
FIG. 11 is an example timing diagram for the sawing stage.

FIG. 11 illustrates a generic timing diagram 1101 covering the sawing stage. The timing diagram 1101 plots along its vertical axis (Y-axis) the displacement of the two following linear actuators: the align cylinder 1103 and the sawing ram 1105, against a common time scale 1107 (X-axis). The convention for the displacement of the linear actuators along the vertical axis (Y-axis) is the following: Extension is in the upward direction and retraction is in the downward direction. Note that FIG. 11 is a simplification and that the scales both in the Y-axis and the X-axis are arbitrary and not to scale.

At the beginning 1109 of the sawing stage the align cylinder 341 represented by line 1103 and the sawing ram 343 represented by line 1105 are both in the retracted end-of-course positions 1111 and 1113, respectively. At time 1019 the sawing ram 1105 move in extension until it contacts the ingot and aligns it against the sawing wall reference 229. The align cylinder 341 does not need a high pressure to accomplish this action and pneumatic actuators are suitable for this purpose. The align cylinder 341 stops at a position 1115 corresponding to the length of the ingot. After a short waiting period 1117-1119 to prevent any bouncing, the align cylinder 341 can go to it end-of-course home position 1111. When the align cylinder 341 reaches its end-of-course home position 1111 at time 1121, the sawing ram 1105 can begin to push the ingot against the blades 227. The sawing ram 1105 advances slowly to avoid damage on the saw blades and to perform nice cuts until time 1123 when it reaches its end-of-course extended position 1127. After waiting a time interval from 1123 to 1125 to ensure that the pucks fall down the puck chute, the sawing ram 1105 retracts towards is end-of-course home position 1113 at time 1129.

Pre-compression Stage

Figure 12:
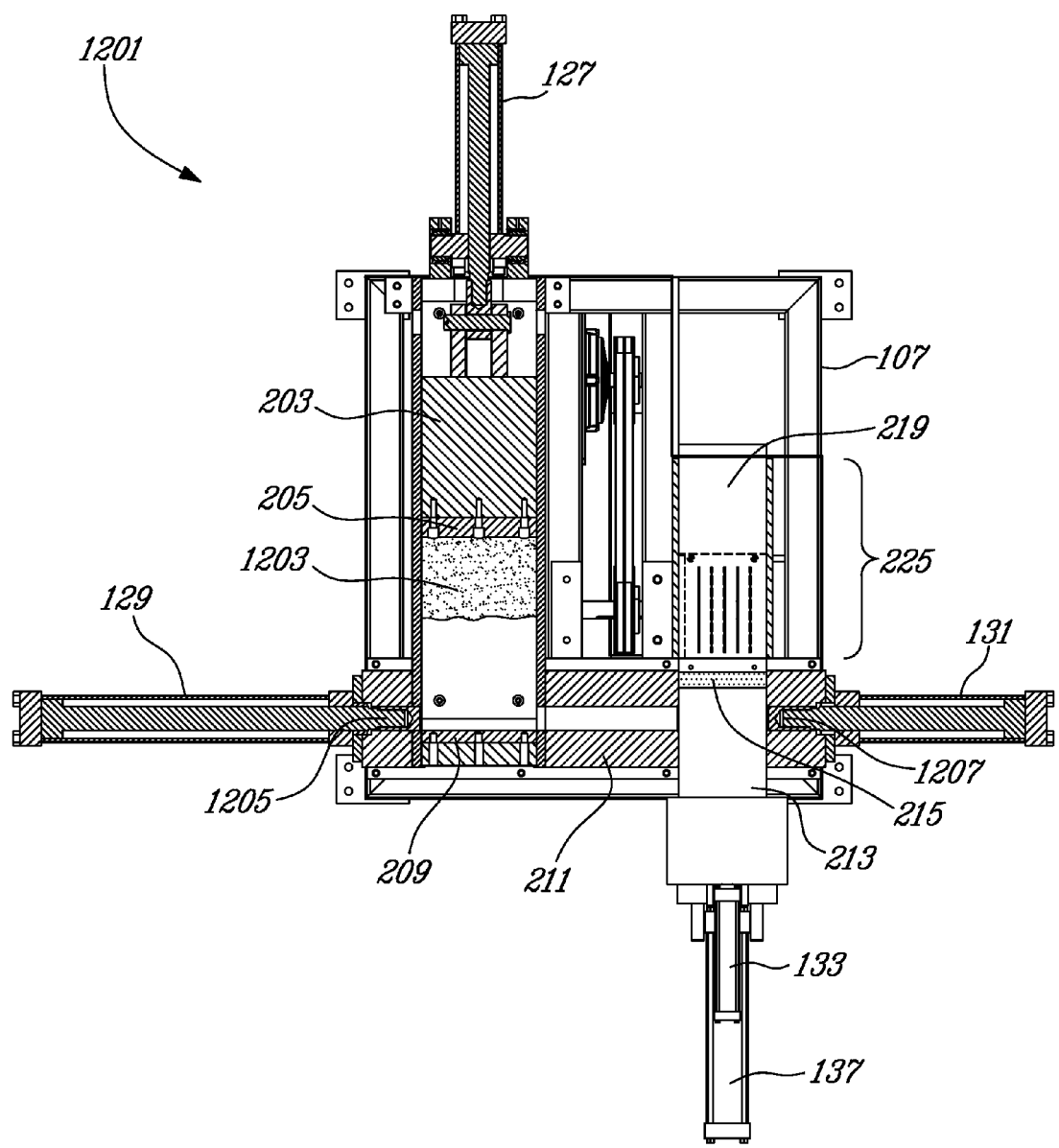
FIG. 12 is a top plan view of the example press of FIG. 1 in which the raw material has fallen from the hopper to the pre-compression ram.

As described in FIG. 10, the pre-compression stage starts with the pre-compression ram fully extended. The first action is for the pre-compression ram to retract to its fully retracted position. As shown in FIG. 12, the pre-compression ram 203 is fully retracted and a certain volume of compressible material 1203 has fallen from the hopper 139 to the pre-compression ram 203 by gravity.

Figure 13:
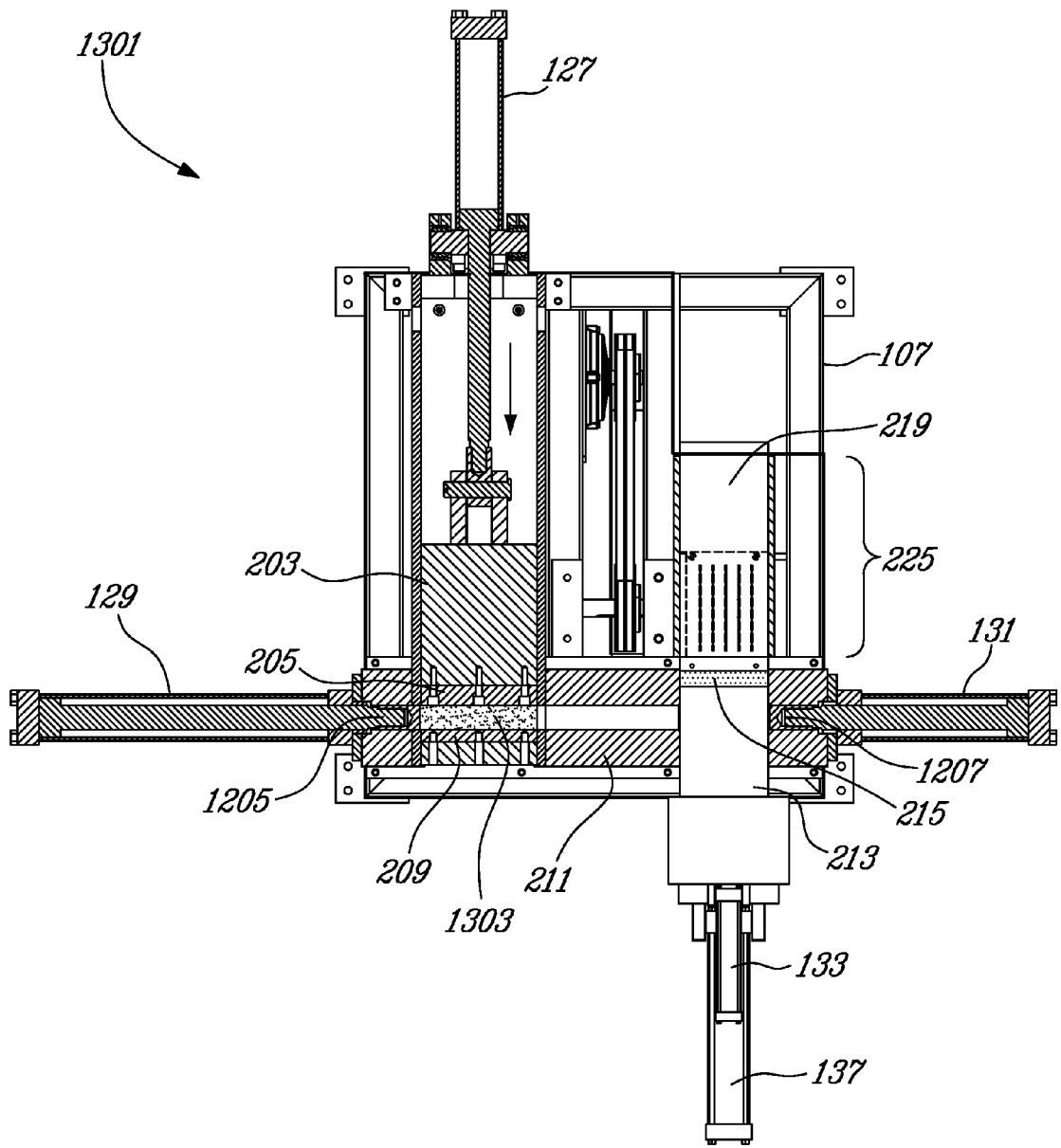
FIG. 13 is a top plan view of the example press of FIG. 1 in which the pre-compression ram has completed its extension and there is resulting pre-compressed material.

The pre-compression ram 203 pushes the compressible material towards the pre-compression chamber 209. FIG. 13 shows the pre-compression ram 203 having completed its extension and the resulting pre-compressed material 1303.

Compression Stage

Figure 14:
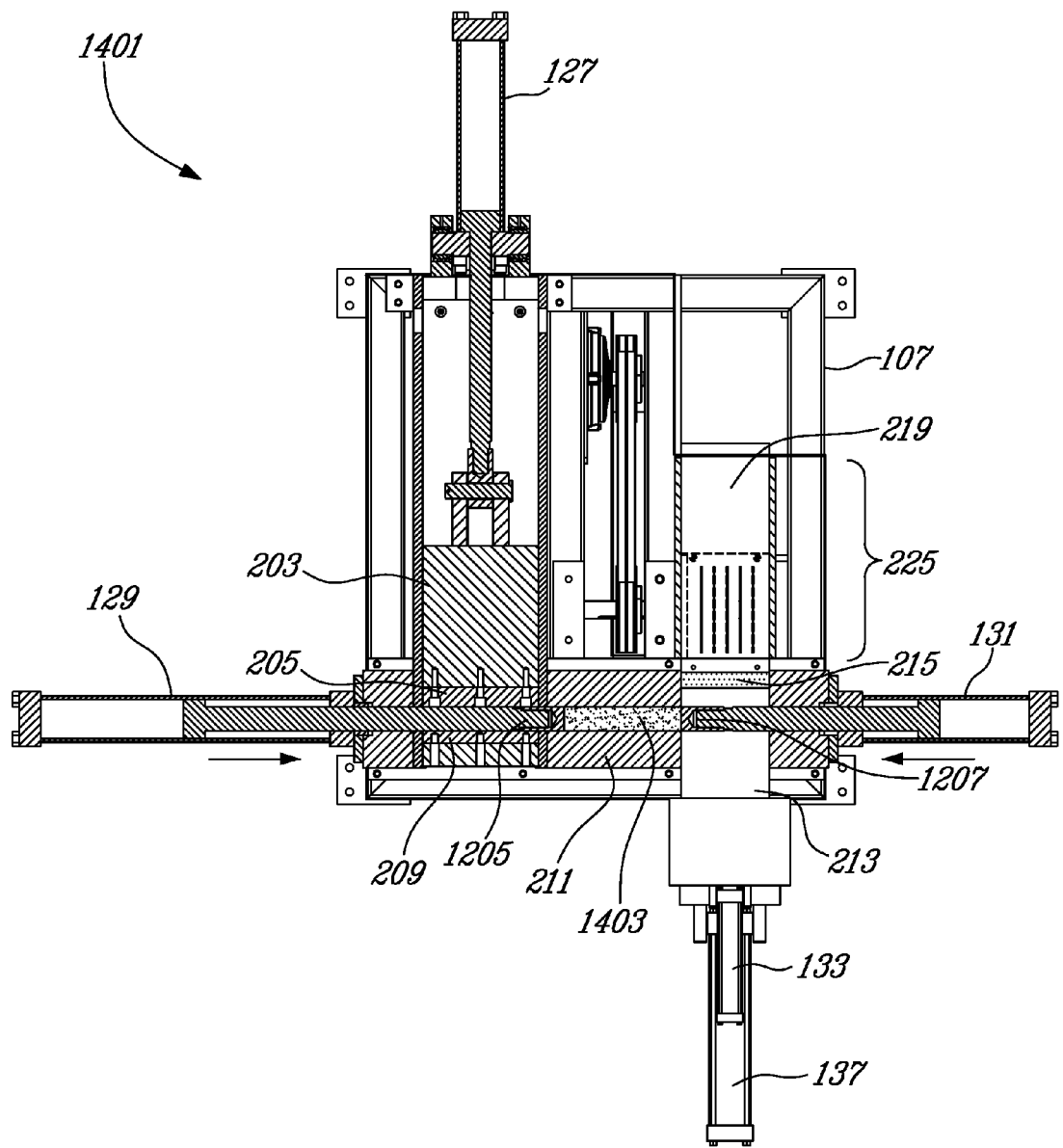
FIG. 14 is a top plan view of the example press of FIG. 1 in which the compression stage has begun with a simultaneous motion of long cylinder and the short cylinder towards the compression chamber.

The compression stage begins with a simultaneous motion of long cylinder 1205 and the short cylinder 1207 towards the compression chamber 211 as illustrated in FIG. 14. The short cylinder 1207 enters through the right hand entrance of the compression chamber 211 and stops a short distance inside the compression chamber 211. This distance is calibrated using a movable position sensor that detects the presence of a reference attached to the short cylinder 1207. The short cylinder 1207 is held stationary in this position until the pre-compressed material gets in contact with the short cylinder 1207.

The long cylinder 1205 pushes the pre-compressed material out of the pre-compression chamber 209 and into the compression chamber 211. After a short moment, the pre-compressed material reaches the end of the short cylinder 1207 and the compression action starts as illustrated in FIG. 14. The material 1403 is undergoing compression and is confined by the walls of the compression chamber 211.

When fiber material is being compressed into an ingot by a piston mechanism, friction is generated against the walls, thereby creating a spatial pressure gradient inside the ingot. The pressure is highest close to the pushing piston and diminishes monotonously inside the ingot with the distance from the piston. The decrease of pressure is a function of the diameter of the ingot and material used. The method proposed in this invention is to use a pushing motion from both ends of the ingot to flatten the pressure distribution, resulting in a more uniform compaction and enabling longer ingots to be manufactured. The bi-directional compression provides the necessary pressure to compact the material in a fashion that permits the proper distribution of lignin and natural binders within the media when using simple standard hydraulic cylinders.

As the material gets compressed, the pressure required by the long cylinder actuator 129 for the long cylinder 1205 to continue advancing increases. When a threshold level of pressure applied to the long cylinder actuator 129 is exceeded, then the short cylinder 1207 is also commanded to advance towards the center of the compression chamber 211 in order to perform a compressive action in the right hand side of the material 1403. Eventually the pressure required by the short cylinder actuator 131 for the short cylinder 1207 to advance also reaches a threshold level of pressure. When both levels of pressure exceed predetermined thresholds, then the compression is considered to have been completed and the system moves to the eject stage.

Eject Stage

Figure 15:
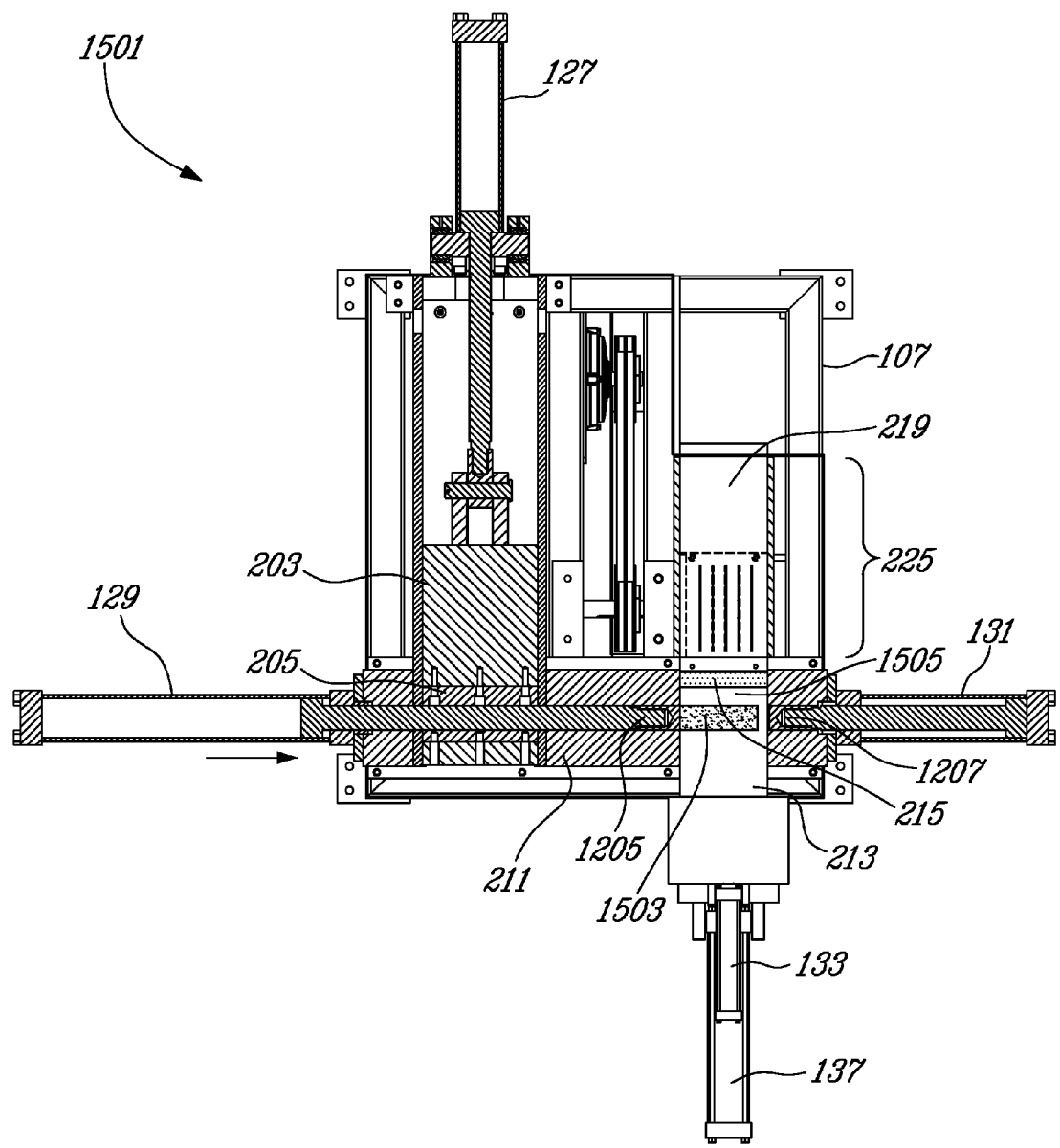
FIG. 15 is a top plan view of the example press of FIG. 1 in which the eject ram is fully extended at the beginning of the eject stage.

At the beginning of the eject stage, the eject ram 213 is fully extended as shown in FIG. 15. The eject ram 213 is located a few centimeters lower than the centerline of the compression chamber 211 as shown in FIG. 16, so the compressed can be ejected above the eject ram 213.

The eject stage begins by commanding both the long cylinder 1205 and the short cylinder 1207 to move towards the right (towards the eject zone), with the same velocity in order to maintain the integrity of the compressed ingot. The motion of the long cylinder 1205 continues until it has reached its own end-of-course position adjusted with a reference sensor so that the tip of the long cylinder 1205 exceeds the compression chamber 211 by a small amount. The short cylinder 1207 continues its motion until it reaches its own end-of-course position, a short instant after the long cylinder 1205 has stopped. FIG. 15 shows the compressed ingot 1503 ejected from the compression chamber 211 and in the eject zone 1505.

Because of the high pressures applied and the nature of the compressible material, the compressed ingot 1503 tends to adhere to the tip of the long cylinder 1205, as illustrated in FIG. 15. A brush 215 extending a short amount above the bottom of the compression chamber 211 is installed on the eject ram 213 to help free the ingots that bind to the tip of either cylinder. This motion is performed on the retracting stroke of the eject ram 213. When the brush 215 passes by the ingot 1503, it applies a shearing force to the ingot 1503, allowing it to come free and fall.

Figure 16:
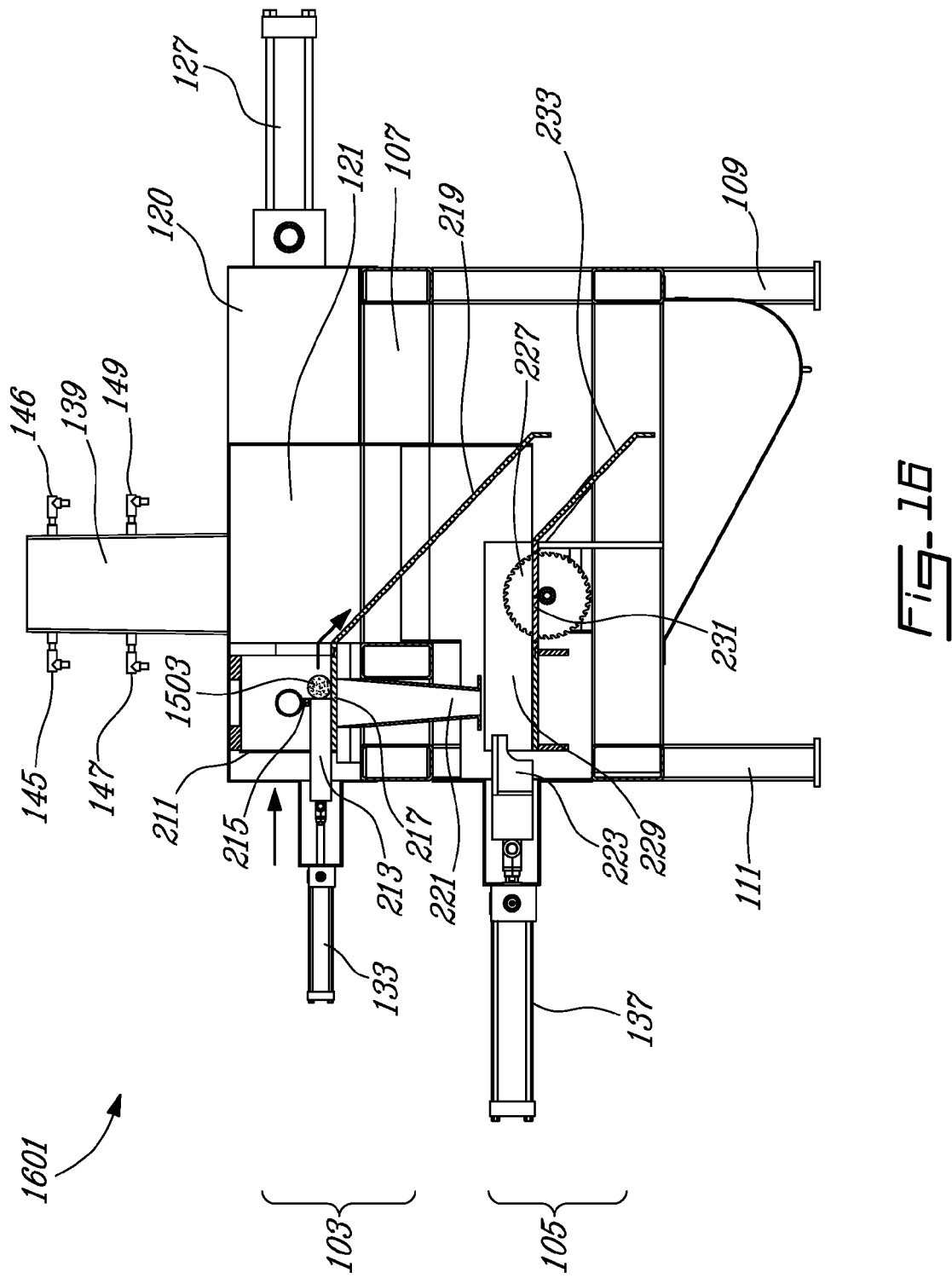
FIG. 16 is a side elevation view of the example press of FIG. 1, in which the ingot floor is present.

In the case where the ingot floor 217 is present, as shown in FIG. 16, the ingot 1503 falls on the ingot floor 217. After the retract motion, the eject ram 213 extends towards the back of the press 101. The motion pushes the ingot 1503 down the sawing chute 219.

Figure 17:
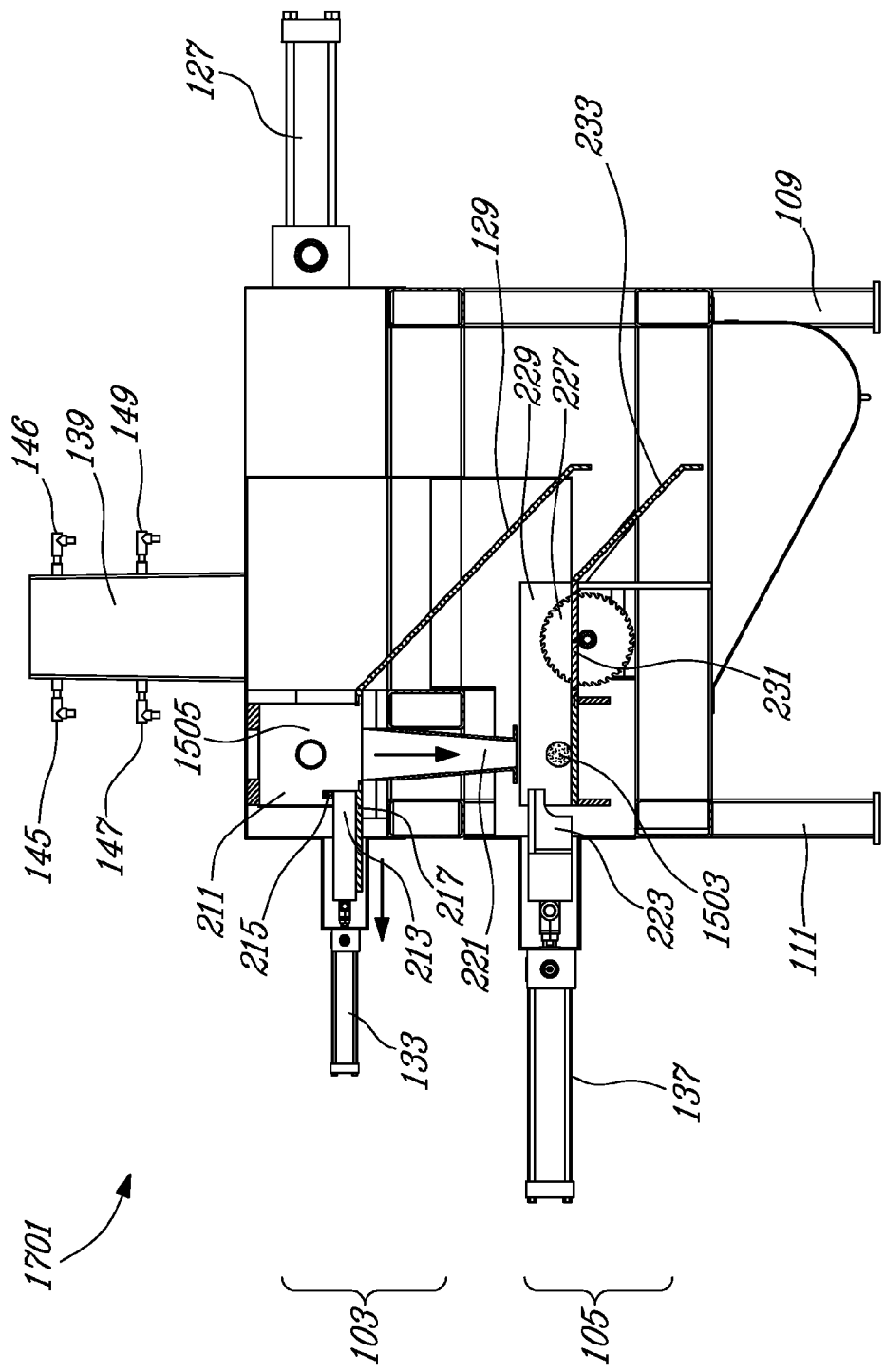
FIG. 17 is a side elevation view of the example press of FIG. 1, in which the ingot floor is absent.

In the case where the ingot floor 217 is absent, after the retracting stroke of the eject ram 213, the ingot 1503 falls down the sawing chute 221 at the lower level 105 of the press 101 as illustrated in FIG. 17. The next step for this ingot 1503 is to be cut into pucks.

Sawing Stage

Figure 18:
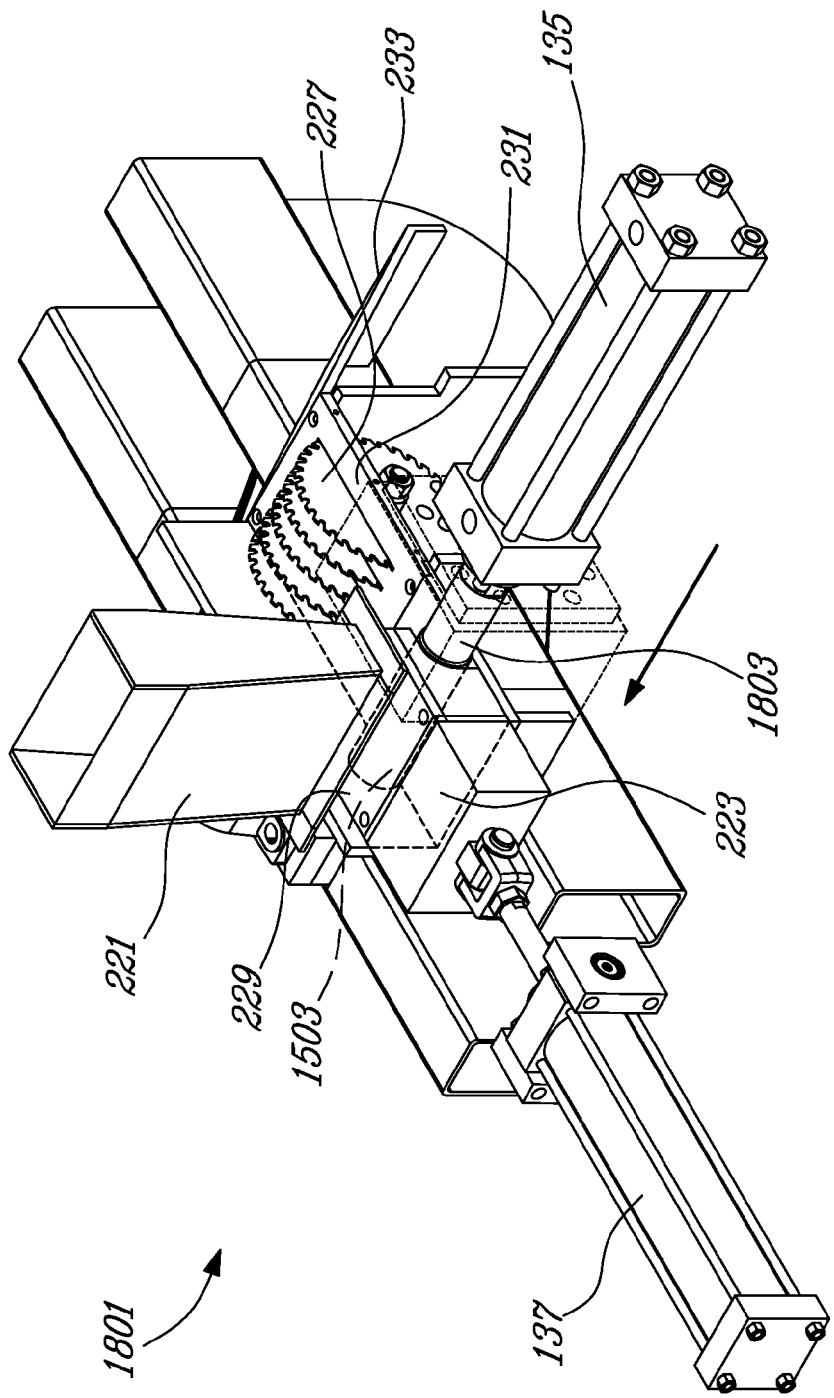
FIG. 18 is a perspective view of the sawing stage of the example press of FIG. 1 in which the align cylinder pushes the ingot towards the left along its axis until the ingot is pressed against the sawing wall reference.
Figure 19:
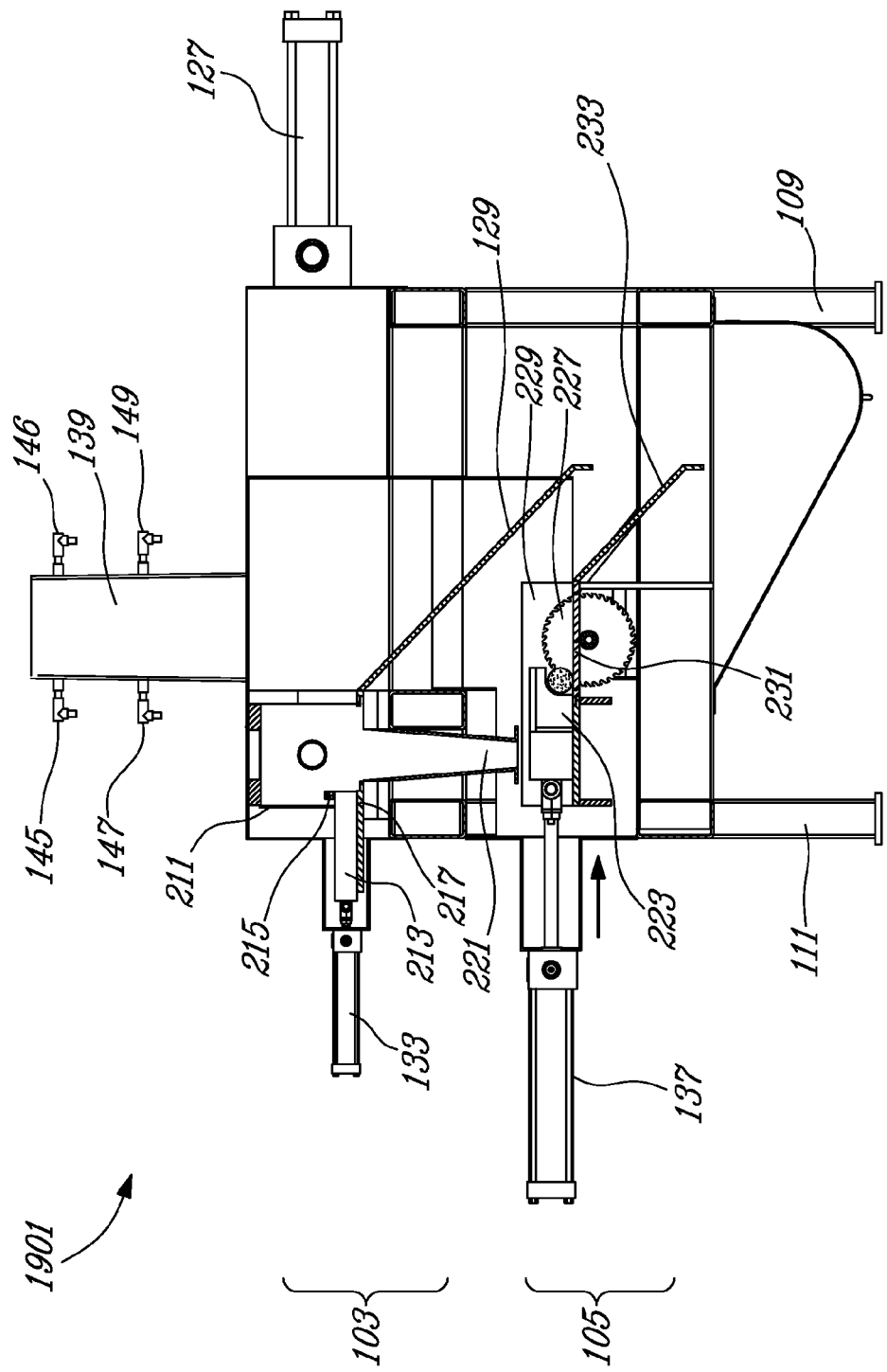
FIG. 19 is a side elevation view of the example press of FIG. 1, in which the sawing ram pushes the ingot toward the array of blades.

After falling down the sawing chute 221, the ingot 1503 lands on the sawing floor 231. Next, the align cylinder 1803 pushes the ingot 1503 towards the left along its axis until the ingot 1503 is pressed against the sawing wall reference 229, as illustrated in FIG. 18. The align cylinder 1803 then retracts away from the ingot 1503. Next, the sawing ram 223 pushes the ingot 1503 toward the array of blades 227 as shown in FIG. 19. The sawing ram 223 guides the ingot 1503 all the way through the sawing blades since it has slots corresponding to individual blades as seen in FIG. 2. The ingot is thus cut into multiple pucks of length equal to the separation between blades.

Figure 20:
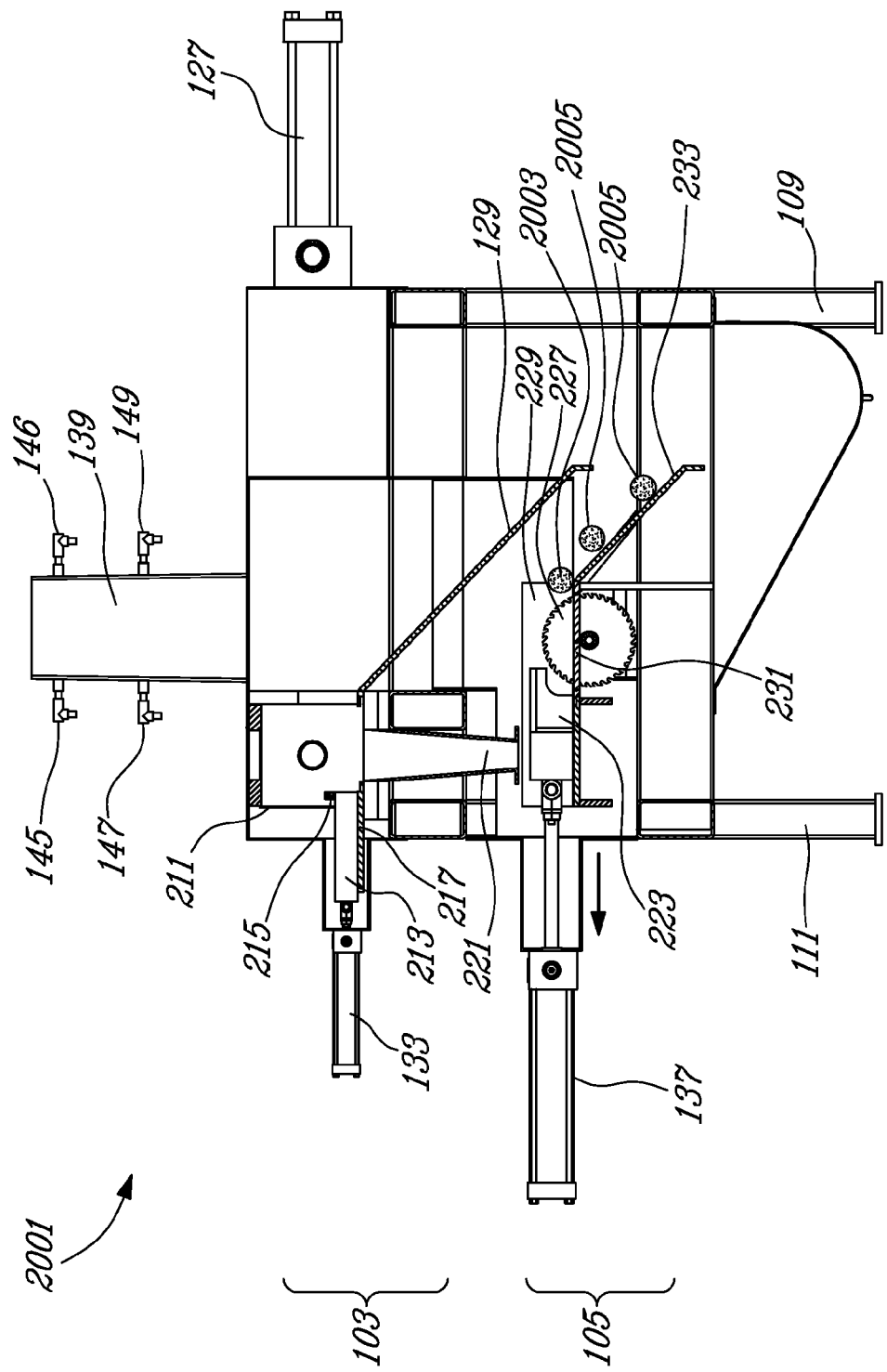
FIG. 20 is a side elevation view of the example press of FIG. 1, in which the pucks are seen exiting in the puck chute.

With an adequate choice of blade positioning and the use of the alignment mechanism composed of the align cylinder 1803 and the sawing wall reference 229, pucks 2005 of equal length are produced except for one shorter puck 2003 at the end opposite to the sawing wall reference 229. The pucks are seen exiting in the puck chute 233 in FIG. 20.

In one example the press 101 is configured to produce 50 mm diameter fuel briquettes. The briquettes are either uncut 38 to 225 mm long ingots or 25 mm long pucks as cut by the saw module 225. This example press possesses various actuators, cylinders and rams. The press uses a 50 mm diameter cylinder with a 560 mm stroke (called the long cylinder 1205) and a 50 mm diameter cylinder with a 290 mm stroke (called the short cylinder 1207). The pre-compression ram 203 is a rectangular prism of 50 mm height and 228 mm width terminated by a concave cylindrical section with a radius of 51.25 mm as shown in FIG. 2. The hopper 139, used to admit the compressible input material in the press 101, is a rectangular prism with nominal dimensions of 490 mm (height) by 205 mm (depth). The width of the hopper can be continuously varied from 15 mm to 150 mm, yielding a hopper volume from 1470 $cm^3$ to 14 7000 $cm^3$. The hopper has a high-level indicator 145, 146 and a low-level indicator 147, 149 located 230 mm and 380 mm from the bottom of the hopper, respectively. The pre-compression chamber 209 has a length of 240 mm and an internal diameter of 50 mm. The compression chamber 211 has a length of 280 mm and an internal diameter of 50 mm. The eject zone 1505 in FIG. 15 offers a 185 mm clearance, sufficient to eject the longest logs. Finally, when the saw module 225 is enabled, the logs are pushed against an array of circular saws, for example 8 circular saws, with a diameter of 203 mm and a width of 2.8 mm. The saws are separated by 27.8 mm in order to produce pucks that measure exactly 25 mm in length.

Feedstock fibers may need pre-processing to achieve proper humidity and particle size input feed requirements.

Although referred to as long and short cylinders, the cylinders could be of a similar length and need not have a length difference. They can be simply a first and a second cylinder.

The embodiments described above are intended to be exemplary only. The scope of the invention is therefore intended to be limited solely by the appended claims.

We claim:

1. A method for preparing a pressed article from compressible and cohesive biomass particles, comprising:
   providing a first pressing ram and a second pressing ram operating in opposite directions and disposed in a compression chamber, in retracted position;
   supplying a quantity of biomass particles in a space in the compression chamber between the first and second pressing rams;
   closing the compression chamber;
   extending the first pressing ram towards the biomass particles in the compression chamber;
   displacing the biomass particles with the first pressing ram towards the second pressing ram;
   detecting abutment of the biomass particles on the second pressing ram once the biomass particles are displaced by the first pressing ram to touch the second pressing ram;
   applying pressure to the biomass particles with the first pressing ram by extending the first pressing ram to abut the biomass particles on the second pressing ram and with the second pressing ram by extending the second press ram to abut the biomass particles on the first pressing ram;
   detecting a pressure applied to match a predetermined compression pressure and continuing to extend the first pressing ram and the second pressing ram until a predetermined time at the matched compression pressure has elapsed, thereby forming a pressed article;
   stopping the extension of the second pressing ram when a predetermined extension length for the second pressing ram is reached;
   continuing to extend the first pressing ram until a predetermined additional time has elapsed after the stopping;
   ejecting a pressed article made of compressed biomass particles from the compression chamber.

2. The method as claimed in claim 1, wherein the first pressing ram is a long cylinder and the second pressing ram is a short cylinder.

3. The method as claimed in claim 1, wherein said closing the compression chamber includes extending the second pressing ram towards a predetermined closing position in the compression chamber.

4. The method as claimed in claim 3, wherein said predetermined closing position is a selected one of a plurality of predetermined closing positions.

5. The method as claimed in claim 1, wherein said ejecting includes displacing said pressed article using the first and second pressing rams by retracting the second pressing ram and extending the first pressing ram at a matched displacement speed to a predetermined ejection location.

6. The method as claimed in claim 5, wherein said ejecting further comprises retracting the second pressing ram further from the predetermined ejection location to a fully retracted location.

7. The method as claimed in claim 5, wherein said ejecting further comprises retracting the first pressing ram to a fully retracted location.

8. The method as claimed in claim 6, wherein said ejecting further comprises retracting the first pressing ram to a fully retracted location while retracting said second pressing ram further to the fully retracted location by using a digital hydraulic by-pass valve to make the second pressing ram slave to the first pressing ram.

9. The method as claimed in claim 1, wherein said ejecting further comprises displacing a perpendicularly disposed ejection ram thereby freeing the pressed article from the compression chamber.

10. The method as claimed in claim 9, wherein the ejection ram has a brush for lifting and releasing the pressed article from the compression chamber.

11. The method as claimed in claim 1, further comprising pre-compressing the quantity of biomass particles prior to said supplying to the compression chamber.

12. The method as claimed in claim 11, wherein said axis of pre-compression is perpendicular to said longitudinal axis of said first and second pressing rams.

13. The method as claimed in claim 11, further comprising supplying a partial quantity of biomass particles for said pre-compressing and repeating said steps of pre-compressing and supplying a partial quantity for a predetermined number of times.

14. The method as claimed in claim 1, further comprising preparing said quantity of biomass particles by estimating a density of said quantity of biomass particles and allowing a calculated volume of said biomass particles to be supplied to said space to form said quantity.

15. The method as claimed in claim 1, wherein said ejecting the pressed article from the compression chamber includes ejecting the pressed article to an ingot chute.

16. The method as claimed in claim 1, wherein said ejecting the pressed article from the compression chamber includes ejecting the pressed article to a sawing chamber and wherein the method further comprises sawing said pressed article into at least two pucks and wherein said ejecting the pressed article includes ejecting the pucks into a puck chute.

17. The method as claimed in claim 16, further comprising abutting one longitudinal end of said pressed article on an interior wall of said sawing chamber prior to said sawing to allow at least one predetermined length of said pressed article to be sawed into one of said at least two pucks.

18. The method as claimed in claim 17, wherein said sawing includes sawing using a plurality of adjacent saws distanced to create pucks of predetermined lengths along said pressed article.

19. The method as claimed in claim 18, wherein said pucks are normalized, equal length and diameter pucks.

20. The method as claimed in claim 1, wherein said stopping the extension of the second pressing ram includes contactless magnetic sensing of the head of the second pressing ram to determine when said predetermined extension length is reached.

21. The method as claimed in claim 1, wherein the method steps are controlled with an electronic control circuit with actuators for the first pressing ram and the second pressing ram.

22. A press for preparing a pressed article from compressible and cohesive biomass particles, comprising:
   a housing;
   a first pressing ram and a second pressing ram operating in opposite directions and disposed in a compression chamber;
   a first pressure detector for the first pressing ram;
   a second pressure detector for the second pressing ram;
   a first actuator for the first pressing ram;
   a second actuator for the second pressing ram;
   an electronic control circuit adapted to control the first and second pressing rams using the first and second actuators and to receive signals from the first and second pressure detectors, the electronic control circuit being programmed to control the first and second pressing rams for:
      extending the first pressing ram towards the biomass particles in the compression chamber;
      displacing the biomass particles with the first pressing ram towards the second pressing ram;
      detecting abutment of the biomass particles on the second pressing ram once the biomass particles are displaced by the first pressing ram to touch the second pressing ram;
      applying pressure to the biomass particles with the first pressing ram by extending the first pressing ram to abut the biomass particles on the second pressing ram and with the second pressing ram by extending the second press ram to abut the biomass particles on the first pressing ram;
      detecting a pressure applied to match a predetermined compression pressure and continuing to extend the first pressing ram and the second pressing ram until a predetermined time at the matched compression pressure has elapsed, thereby forming a pressed article;
      stopping the extension of the second pressing ram when a predetermined extension length for the second pressing ram is reached;
      continuing to extend the first pressing ram until a predetermined additional time has elapsed after the stopping;
      ejecting a pressed article made of compressed biomass particles from the compression chamber.

* * * * *